US012688463B2

(12) United States Patent
Aggarwal et al.

(10) Patent No.: US 12,688,463 B2
(45) Date of Patent: Jul. 21, 2026

(54) TIME-BOUND HYPERPARAMETER TUNING

(71) Applicant: Oracle International Corporation, Redwood Shores, CA (US)

(72) Inventors: Ankit Kumar Aggarwal, Mumbai (IN); Vikas Pandey, Bengaluru (IN); Chirag Ahuja, Delhi (IN); Jie Xing, Redmond, WA (US); Hariharan Balasubramanian, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 455 days.

(21) Appl. No.: 18/470,220

(22) Filed: Sep. 19, 2023

(65) Prior Publication Data

US 2025/0094861 A1 Mar. 20, 2025

(51) Int. Cl.
*G06N 20/00* (2019.01)
(52) U.S. Cl.
CPC .................................. *G06N 20/00* (2019.01)
(58) Field of Classification Search
CPC ....................................................... G06N 20/00
See application file for complete search history.

(56) References Cited

U.S. PATENT DOCUMENTS

| | | |
|---|---|---|
| 11,030,484 B2 | 6/2021 | Walters et al. |
| 11,410,083 B2 | 8/2022 | Vasudevan et al. |
| 2020/0327448 A1* | 10/2020 | Yakovlev ............... G06N 3/048 |
| 2022/0121993 A1 | 4/2022 | Hayes et al. |

FOREIGN PATENT DOCUMENTS

| | | |
|---|---|---|
| CN | 108062587 A | 5/2018 |
| WO | 2015184729 A1 | 12/2015 |

OTHER PUBLICATIONS

Hertel et al., "Sherpa: Robust Hyperparameter Optimization for Machine Learning", Available online At: https://www.sciencedirect.com/science/article/pii/S2352711020303046, 2020, 10 pages.

(Continued)

*Primary Examiner* — Asher D Kells
(74) *Attorney, Agent, or Firm* — Kilpatrick Townsend & Stockton LLP

(57) ABSTRACT

Techniques for time-bound hyperparameter tuning are disclosed. The techniques enable the determination of optimized hyperparameters for a machine learning (ML) model given a specified time bound using a three-stage approach. A series of trials are executed, during each of which the ML model is trained using a distinct set of hyperparameters. In the first stage, a small number of trials are executed to initialize the algorithm. In the second and third stages, a certain number of trials are executed in each stage. The number of trials to run in each stage are determined using one or more computer-implemented techniques. The computer-implemented techniques can also be used to narrow the hyperparameter search space and the feature space. Following the third stage, a set of optimized hyperparameters is adopted based a predefined optimization criterion like minimization of an error function.

20 Claims, 16 Drawing Sheets

(56) References Cited

OTHER PUBLICATIONS

Racca et al., "Robust Optimization and Validation of Echo State Networks for Learning Chaotic Dynamics", Available online At: https://arxiv.org/pdf/2103.03174.pdf, 2021, 29 pages.
Wang et al., "Automatic Hyperparameter Tuning of Machine Learning Models under Time Constraints", Available online At: https://ieeexplore.ieee.org/document/8622384, Dec. 2018, pp. 4967-4973.
Zhang et al., "ABCModeller: An Automatic Data Mining Tool Based on a Consistent Voting Method with a 9 User-friendly Graphical Interface", Available online At: https://academic.oup.com/bib/article-abstract/22/4/bbaa247/5924101, Oct. 2020, 10 pages.

* cited by examiner

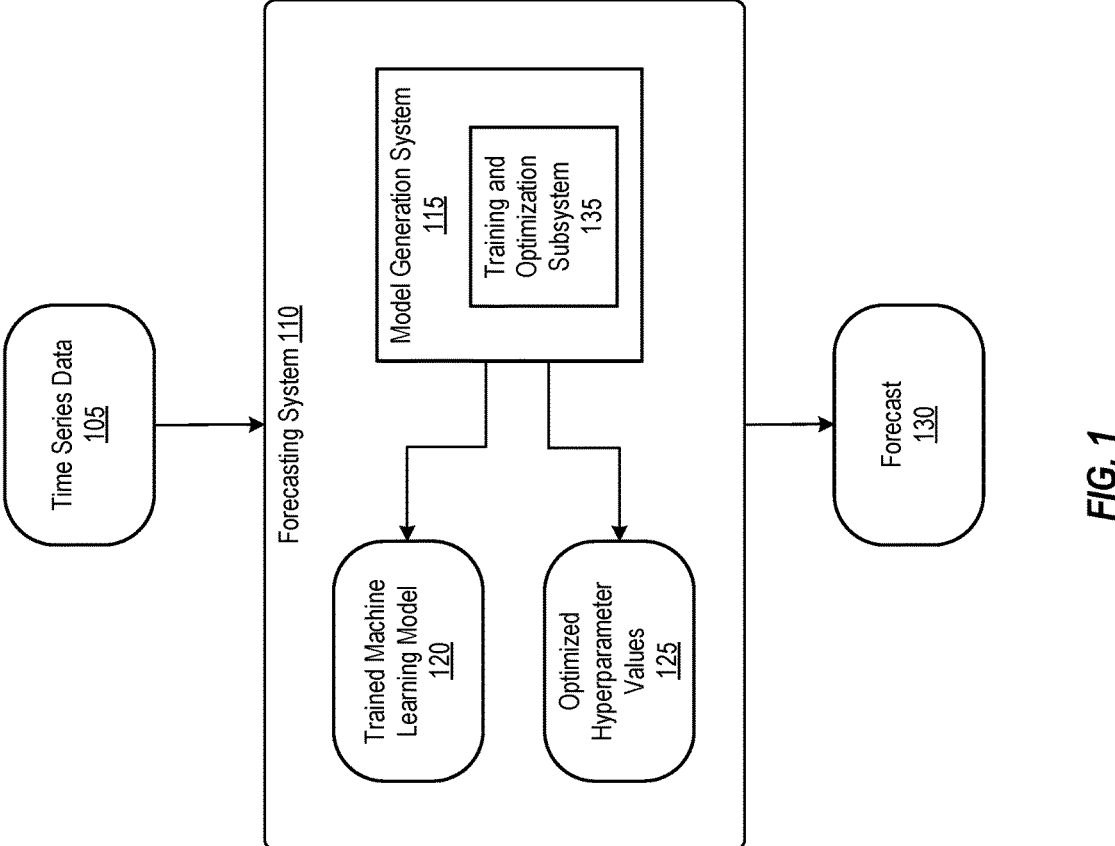
*FIG. 1*

300

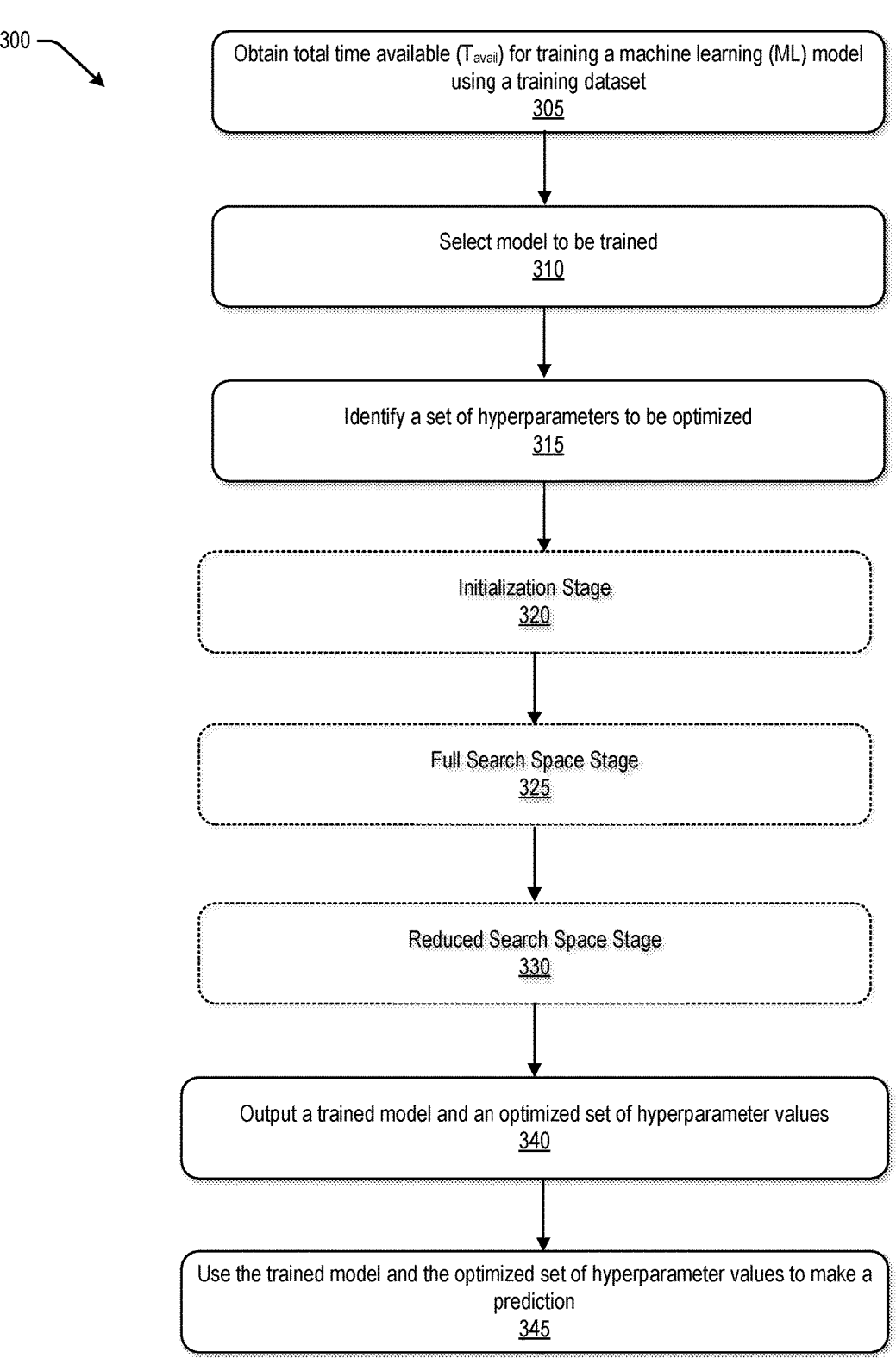

Obtain total time available ($T_{avail}$) for training a machine learning (ML) model using a training dataset
305

Select model to be trained
310

Identify a set of hyperparameters to be optimized
315

Initialization Stage
320

Full Search Space Stage
325

Reduced Search Space Stage
330

Output a trained model and an optimized set of hyperparameter values
340

Use the trained model and the optimized set of hyperparameter values to make a prediction
345

FIG. 3

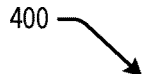
400
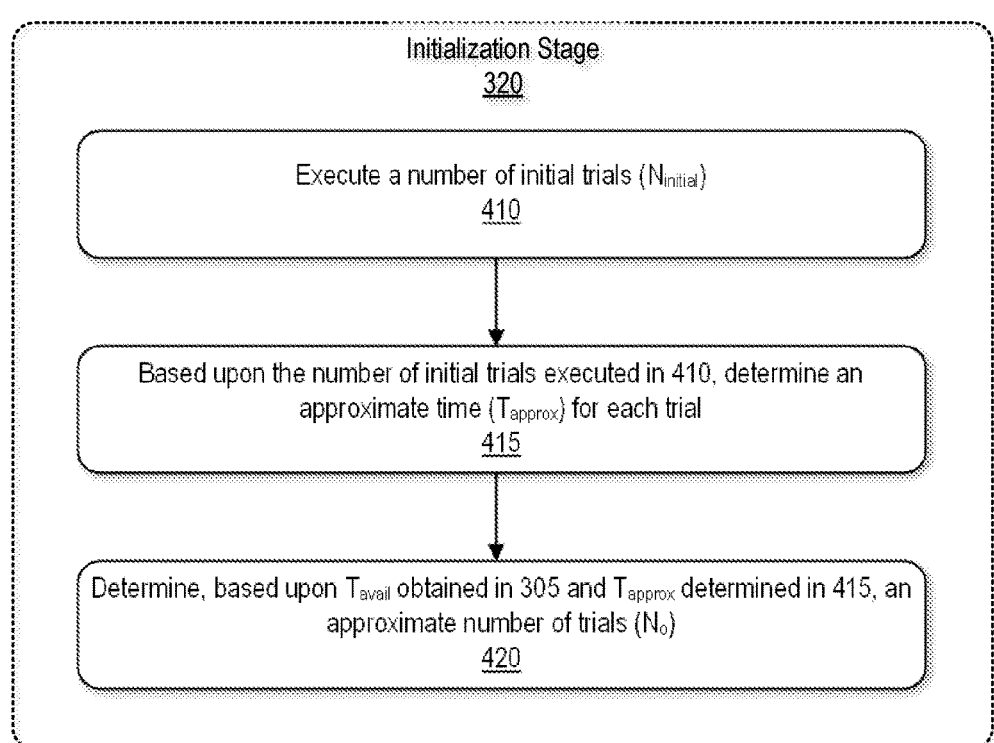
Initialization Stage
320
Execute a number of initial trials ($N_{initial}$)
410
Based upon the number of initial trials executed in 410, determine an approximate time ($T_{approx}$) for each trial
415
Determine, based upon $T_{avail}$ obtained in 305 and $T_{approx}$ determined in 415, an approximate number of trials ($N_o$)
420
FIG. 4

500

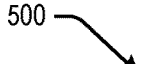

Full Search Space Stage
325

Using a first computer-implemented technique, determine, based upon $N_o$ identified in 420, a first number of first trials ($N_{full}$) to be executed using the full search space and feature set
505

Determine a number $N_{search} = N_{full} - N_{initial}$ of trials to execute in the Full Search Space Stage
510

Execute $N_{search}$ trials using the full search space and feature set, each with a different combination of hyperparameter values
515

Determine a number of top trials ($N_{top}$) to select from the trials executed in 410 and 515
520

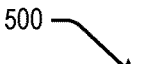

Full Search Space Stage
325

5A

Identify the top N$_{top}$ trials, from the trials executed in 410 and 515
525

Based upon the N$_{top}$ trials identified in 525, identify a reduced set of features
530

Based upon the N$_{top}$ trials identified in 525, for at least one hyperparameter in the set of hyperparameters, determine a reduced search space for the hyperparameter, where the reduced search space has a smaller number of values than the number of values in the full search space for that hyperparameter
535

Using a second computer-implemented technique, determine a second number of trials (N$_{reduced}$) to be executed using the reduced set of features identified in 530 and the reduced search space for one or more hyperparameters determined in 535
540

*FIG. 5B*

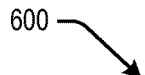

600

Using a first computer-implemented technique, determine, based upon $N_o$ identified in 420, a first number of first trials ($N_{full}$) to be executed using the full search space and feature set
505

Solve the equation $n(1 + F^2) = N_o$ for $n$, where $F$ is the ratio represented by $\frac{1+\sqrt{5}}{2}$

610

Determine a first Fibonacci number based upon $n$ determined in 610
615

Set $N_{full}$ to be the first Fibonacci number determined in 615
620

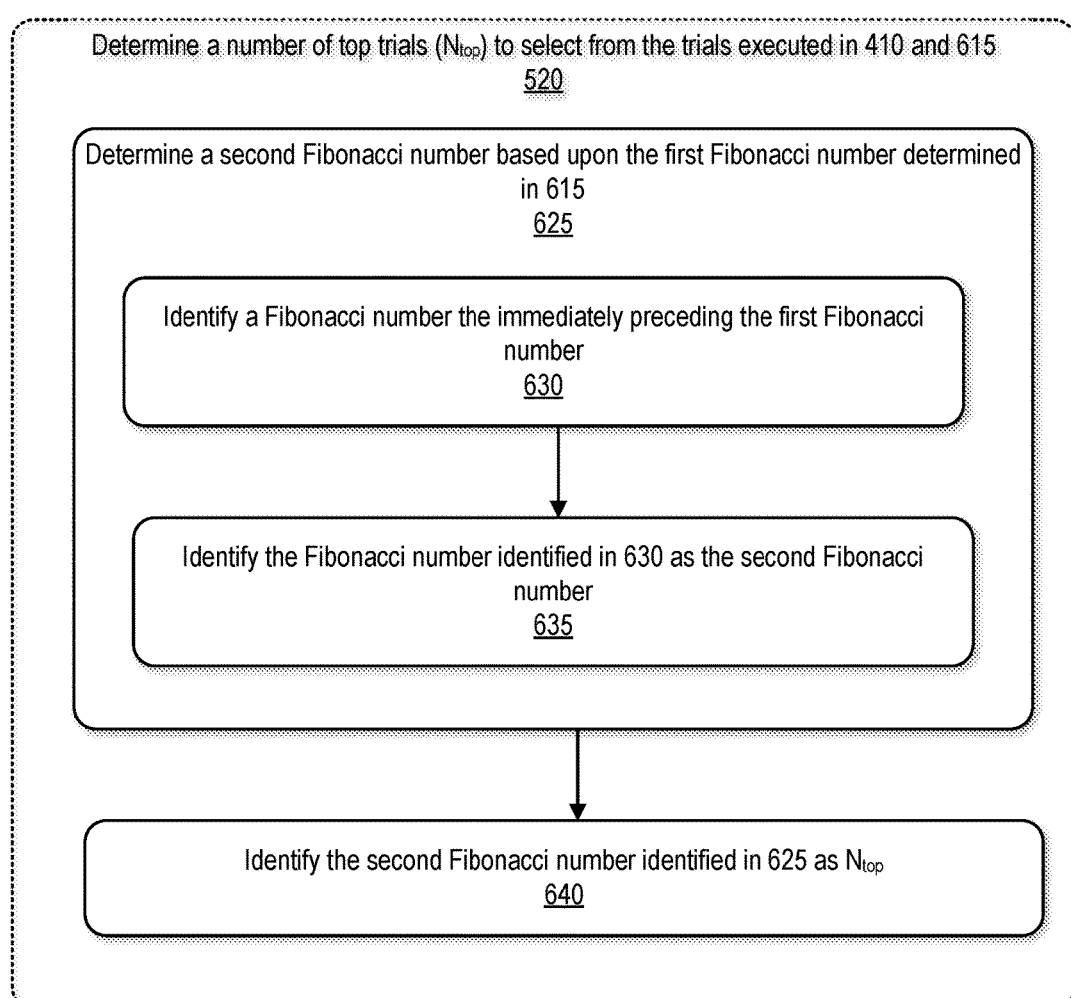

Determine a number of top trials (N_top) to select from the trials executed in 410 and 615
520

Determine a second Fibonacci number based upon the first Fibonacci number determined in 615
625

Identify a Fibonacci number the immediately preceding the first Fibonacci number
630

Identify the Fibonacci number identified in 630 as the second Fibonacci number
635

Identify the second Fibonacci number identified in 625 as N_top
640

*FIG. 6B*

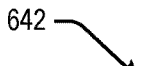

642

Using a second computer-implemented technique, determine a second number of trials (N_reduced) to be executed using the reduced set of features identified in 530 and the reduced search space for one or more hyperparameters determined in 535
540

Determine a third Fibonacci number based upon the first Fibonacci number determined in 615
645

Identify a sequence of three consecutive Fibonacci numbers where the first Fibonacci number determined in 615 is the largest Fibonacci number in the sequence
650

Identify the smallest Fibonacci number in the sequence as the third Fibonacci number
655

Identify the third Fibonacci number identified in 645 as N_reduced
660

*FIG. 6C*

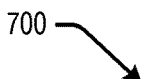

700

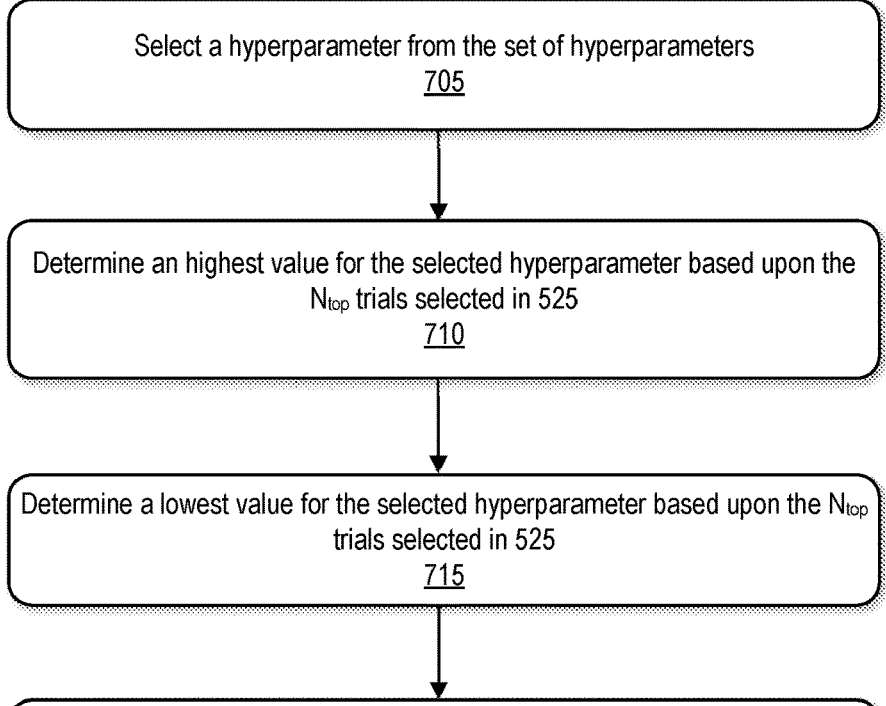

Select a hyperparameter from the set of hyperparameters
705

Determine an highest value for the selected hyperparameter based upon the N$_{top}$ trials selected in 525
710

Determine a lowest value for the selected hyperparameter based upon the N$_{top}$ trials selected in 525
715

Identify a reduced search space for the hyperparameter based upon the highest value determined in 710 and the lowest value determined in 715, where the reduced search space corresponds to a range of values determined based upon the highest value and the lowest value, and where the number of values in the reduced search space for the hyperparameter is smaller than the number of values in the full search space for the hyperparameter
720

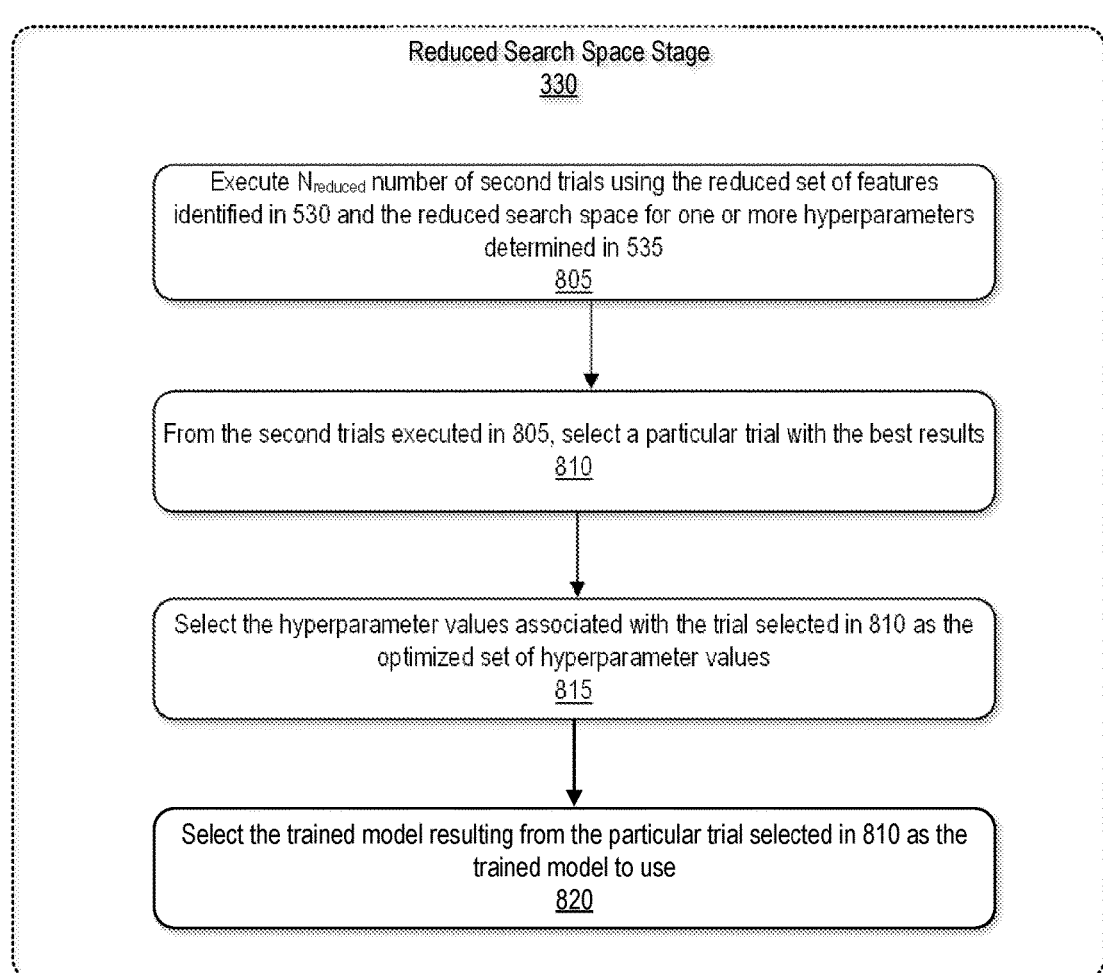

Reduced Search Space Stage
330

Execute N_reduced number of second trials using the reduced set of features identified in 530 and the reduced search space for one or more hyperparameters determined in 535
805

From the second trials executed in 805, select a particular trial with the best results
810

Select the hyperparameter values associated with the trial selected in 810 as the optimized set of hyperparameter values
815

Select the trained model resulting from the particular trial selected in 810 as the trained model to use
820

*FIG. 8*

TIME-BOUND HYPERPARAMETER TUNING

BACKGROUND

It is increasingly common to see complex problems tackled using machine learning (ML) models. But the usefulness of any ML model is limited by the process used to "train" it. Typically, training an ML model refers to an iterative process of applying the ML model to training data to minimize an objective function. A feedback mechanism, like backpropagation, is used to improve the performance of the model as the training proceeds. Following training, the trained ML model (e.g., a set of parameters that characterize a multi-dimensional linear regression model) is evaluated to ensure that its performance is suitable for the particular use case.

An important part of the iterative training process involves hyperparameter tuning. Hyperparameters are typically tunable parameters relating to the training of the ML model but that are not actually a part of the ML model itself. Examples of hyperparameters for some ML models include the learning rate, smoothing factors, neural network structural parameters, training data batch size, and so on. Hyperparameters can determine how quickly or how well an ML model is trained and thus may ultimately affect how accurate and useful the final, trained ML model is. Thus, selection of hyperparameter values is an important step in the iterative training process.

One inefficient approach to hyperparameter optimization involves fully exploring the hyperparameter search space and identifying the optimized set of hyperparameter values found during an ordered walk through the hyperparameter search space. For instance, in an example in which unlimited computing time and resources are available, an optimized set of hyperparameter values may be defined as the set that would produce the ML model with some desired accuracy in the shortest possible period of time. The hyperparameter search space can be fully sampled using a comprehensive grid search approach, in which a "trial" is performed for each set of hyperparameter values in the search space. During each trial, the ML model can be trained to completion and a suitable performance metric evaluated to compare the performance of different sets of hyperparameter values.

But computing time and resources are often scarce. More efficient approaches to hyperparameter tuning are often sought to improve the results that can be obtained through ML training while economizing on the computing resources available for training. For example, instead of walking through the entire hyperparameter search space, hyperparameter values may be chosen at random to cover more of the hyperparameter search space in a shorter period of time. Both of these methods are grossly inefficient, however, in that they fail to incorporate the results of previous trials.

Thus, some more sophisticated approaches can be used that incorporate all available information to optimize hyperparameter tuning given the available time and computing resources. For example, in Bayesian optimization strategies, a surrogate function is used to probabilistically model the hyperparameter search space with respect to the performance of the ML model. Hyperparameter optimization proceeds efficiently by using the surrogate function to choose the set of hyperparameter values for the next trial based on probabilistic inferences about the known performance of the hyperparameters thus far.

However, use of a Bayesian optimization strategy or any other particular algorithmic approach to hyperparameter tuning leaves unanswered practical questions about how to operate an ML model training system in the real world. For example, in a typical scenario, a system may need to complete the training of an ML model in a bounded amount of time given a limited set of computing resources. The ML model training system must be configured to make the best possible use of the available time and computing resources to obtain the desired accuracy or other performance metric. Existing techniques may relate to how to perform a particular hyperparameter optimization trial or series of trials but lack the capability to chart a course for obtaining optimized hyperparameter values given a limited amount of time and computing resources.

BRIEF SUMMARY

The present disclosure relates to optimized hyperparameter tuning given a specified time bound. More specifically, techniques are described that enable the determination of optimized hyperparameter values for a machine learning (ML) model given a specified time bound using a three-stage approach. A series of trials are executed, during each of which the ML model is trained using a distinct set of hyperparameter values. In the first stage, a small number of trials are executed to initialize the algorithm. In the second and third stages, a number of trials are executed in each stage respectively. The number of trials to run in each stage are determined using one or more computer-implemented techniques. The computer-implemented techniques can also be used to narrow the hyperparameter search space and the feature space between the second and third stages. Following the third stage, a set of optimized hyperparameter values is adopted based a predefined optimization criterion like minimization of an error function.

In one example, the computer-implemented techniques are based on the golden ratio. The golden ratio is used to determine the various quantities that structure the three-stage approach. As they are related by the golden ratio, some related quantities can be conveniently mapped to certain Fibonacci numbers.

In this example, the algorithm is framed by the time available for ML model training. In the first stage, the approximate time a trial takes to execute is estimated. This time is then used to estimate the number of trials that can be executed in the available time. This overall number of trials is used to establish a first Fibonacci number that corresponds to the number of trials that will be run using the full hyperparameter search space and full feature space (i.e., the first and second stages). The previous Fibonacci number is used to determine the number of completed trials to use as a basis for reducing the hyperparameter search space and feature space. Finally, the next-previous Fibonacci number determines the number of trials to execute in the third stage using a reduced hyperparameter search space and feature space.

Various embodiments are described herein, including methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

In certain embodiments, the techniques include a computer-implemented method. In the method, a computing device determines a total time available for training an ML model using a training dataset. The training includes, among other steps, performing hyperparameter optimization for the ML model. The computing device executes a number of initial trials. During the initial trials, several steps are carried out for each trial in the initial trials. For each trial, for each hyperparameter in a set of hyperparameters, a hyperparameter value for the hyperparameter from a full search space associated with the hyperparameter is selected and the ML model is trained using the training dataset and the selected set of hyperparameter values. The computing device then determines an approximate time for executing a trial based upon the execution time of the initial trials. Next, the computing device uses a first computer-implemented technique to determine a first number of first trials to be executed, in which using the first computer-implemented technique receives as input the total time available and the approximate time for executing a trial. The computing device then executes the first number of first trials, in which executing the first number of first trials includes a series of steps for each first trial in the first trials. For each first trial, for each hyperparameter in the set of hyperparameters, a hyperparameter value for the hyperparameter from a full search space associated with the hyperparameter is selected and the ML model is trained using the training dataset and the selected set of hyperparameter values. The computing device uses a second computer-implemented technique to determine a second number of second trials to be executed, wherein the second computer-implemented technique comprises uses the first number of first trials. The computing device then executes the second number of second trials, wherein executing the second number of second trials includes a series of steps. For each second trial, for each hyperparameter in the set of hyperparameters, a hyperparameter value for the hyperparameter from a reduced search space associated with the hyperparameter is selected and the ML model is trained using the training dataset and the selected set of hyperparameter values selected from the reduced search space associated with each hyperparameter in the set of hyperparameters. The computing device next selects a particular second trial from the second trials and designates the hyperparameter values used for the particular second trial as a set of optimized hyperparameter values. The computing device then outputs a trained ML model trained in the particular second trial and the set of optimized hyperparameter values.

In certain embodiments, using the first computer-implemented technique may include, based upon the total time available for training the ML model and the approximate time for executing a trial, first determining an approximate number of trials. Next, a first Fibonacci number is determined using $N_o$ and the first number of first trials is determined by subtracting the number of initial trials from the first Fibonacci number.

In certain embodiments, determining the first Fibonacci number may include first determining n using the equation $n(1+F^2)=N_o$, in which F is a ratio represented by $$\frac{1+\sqrt{5}}{2}.$$

Next, determining the first Fibonacci number may further include identifying a Fibonacci number that is equal to or greater than $nF^2$ as the first Fibonacci number.

In some embodiments, using the second computer-implemented technique may include determining a third Fibonacci number based upon the first Fibonacci number and designating the third Fibonacci number as the second number of second trials.

In some embodiments, determining the third Fibonacci number may include identifying a sequence of three consecutive Fibonacci numbers, in which the first Fibonacci number is the largest number in the sequence and designating the smallest Fibonacci number in the sequence as the third Fibonacci number.

In some embodiments, the computing device may select a number of top trials from the initial trials and the first trials. Based upon the selected top trials, the computing device may, for at least one hyperparameter in the set of hyperparameters, identify a reduced search space for the at least one hyperparameter, in which the identified reduced search space for the at least one hyperparameter has a smaller number of values then a number of values in the full search space for the at least one hyperparameter. In this embodiment, executing the second number of second trials may include, for each second trial, setting a value for the at least one hyperparameter from the reduced search space identified for the at least one hyperparameter.

In certain embodiments, selecting the number of top trials from the initial trials and the first trials may include determining a second Fibonacci number based upon the first Fibonacci number and designating the second Fibonacci number as the number of top trials.

In certain embodiments, determining the second Fibonacci number can include designating a Fibonacci number that immediately precedes the first Fibonacci number as the second Fibonacci number.

In certain embodiments, identifying the reduced search space for the at least one hyperparameter may include determining a highest value used for the at least one hyperparameter in the selected top trials and determining a lowest value used for the at least one hyperparameter in the selected top trials. Identifying the reduced search space for the at least one hyperparameter may further include determining a range of values wherein the range is bounded by the highest value and the lowest value, in which the range represents the reduced search space for the at least one hyperparameter.

In certain embodiments, the computing device may select a number of top trials from the initial trials and the first trials. Based upon the selected top trials, the computing device may, for at least one hyperparameter in the set of hyperparameters, identify a reduced search space for the hyperparameter, in which the identified reduced search space for the hyperparameter has a smaller number of values then a number of values in the full search space for the at least one hyperparameter. The computing device can then identify a reduced set of features from a set of features used in the initial trials and in the first trials. In this embodiment, executing the second number of second trials comprises, may include, for each second trial, setting a value for the at least one hyperparameter from the reduced search space identified for the at least one hyperparameter and using the reduced set of features.

In certain embodiments, identifying the reduced set of features may include selecting one or more features, from the set of features, to be included in the reduced set of features based upon feature importance scores assigned to the set of features.

In certain embodiments, for at least one trial in the initial trials, first trials, or second trials, Bayesian optimization may be used to select values for the hyperparameters in the set of hyperparameters.

In certain embodiments, determining the approximate time for executing a trial may include determining an execution time for executing each of the initial trials and determining an average time by averaging the execution times determined for executing each of the initial trials. Determining the approximate time for executing a trial may further include designating the average time as the approximate time for executing a trial.

In certain embodiments, the training dataset may include one or more time series, each time series comprising a plurality of datapoints, each data point in the plurality of datapoints characterized by a time and at least one associated value.

In certain embodiments, selecting the particular second trial from the second trials may include selecting a trial from the second trials having a highest performance metric.

In certain embodiments, different combinations of hyperparameter values may be used for the initial trials and the first trials.

The foregoing, together with other features and embodiments will become more apparent upon referring to the following specification, claims, and accompanying drawings.

BRIEF DESCRIPTION OF THE DRAWINGS

FIG. 1 depicts a simplified block diagram of an example forecasting system for time-bound hyperparameter tuning, according to certain embodiments.

FIG. 3 depicts a simplified flowchart showing a method for time-bound hyperparameter optimization techniques, according to certain embodiments.

FIG. 4 depicts a simplified flowchart showing a method for time-bound hyperparameter optimization techniques, according to certain embodiments.

FIGS. 5A-B depict a simplified flowchart showing a method for time-bound hyperparameter optimization techniques, according to certain embodiments.

FIGS. 6A-C depict simplified flowcharts showing methods for time-bound hyperparameter optimization techniques, according to certain embodiments.

FIG. 7 depicts a simplified flowchart showing a method for time-bound hyperparameter optimization techniques, according to certain embodiments.

FIG. 8 depicts a simplified flowchart showing a method for time-bound hyperparameter optimization techniques, according to certain embodiments.

DETAILED DESCRIPTION

Figure 2:
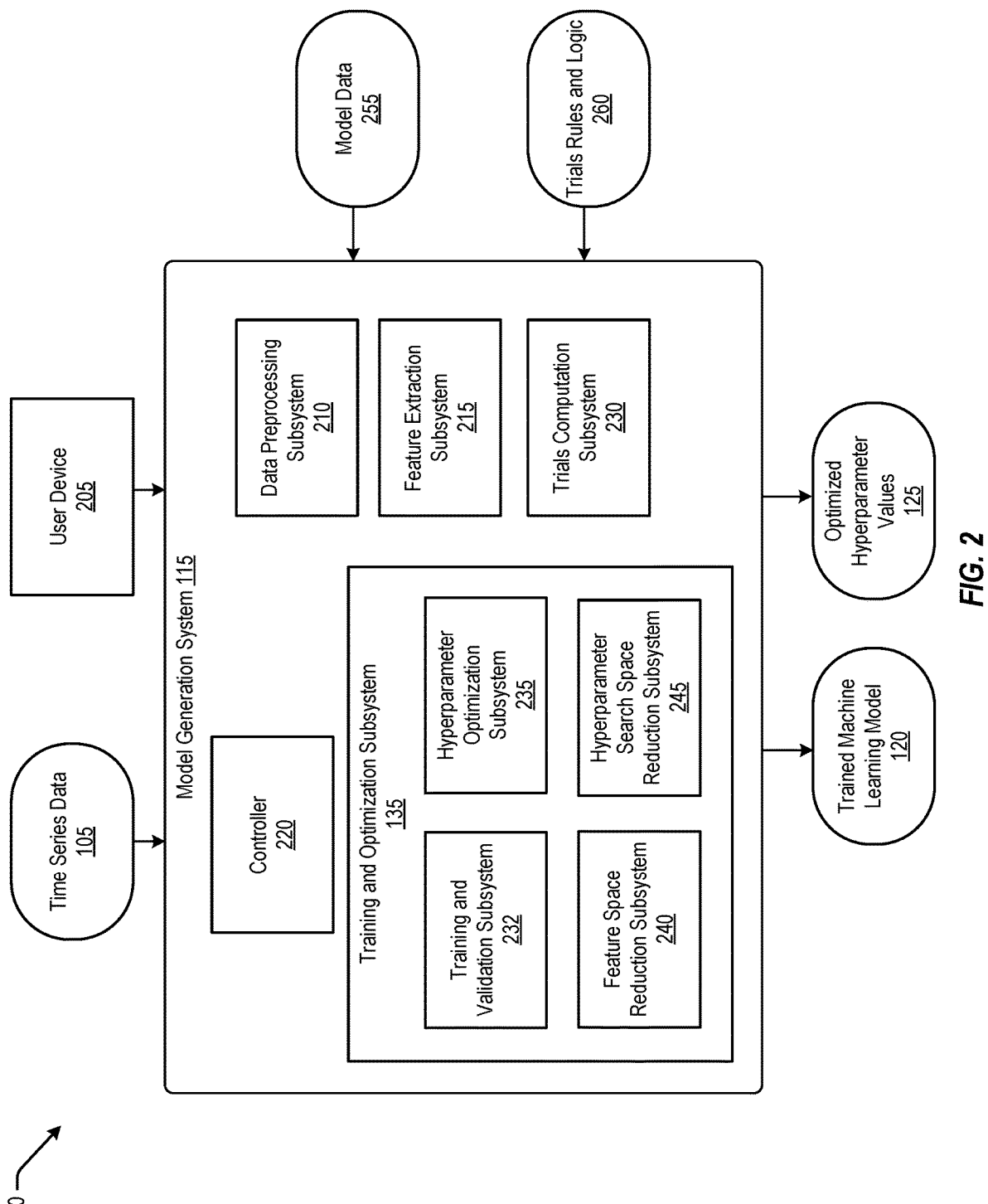
FIG. 2 depicts a simplified block diagram of an example forecasting system for time-bound hyperparameter tuning, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

A machine learning (ML) model is a mathematical representation "learned" from certain training data that can make predictions or decisions without being explicitly programmed to do so. An ML model is represented or defined by a set of parameters that are internal to the model. These parameters are thus also referred to as model parameters. The nature of the model parameters depends upon the type of ML model. For example, for a deep neural network, the model parameters include the weights and biases associated with the nodes in the neural network. As another example, for a regression model, the model parameters include the coefficients associated with the model. As yet another example, for a model that performs clustering, the model parameters include the centroids of the model.

An ML model is usually trained using a learning algorithm to generate a trained model. A training dataset that includes ground truth information may be used to train a model. Ground truth, in this respect, refers to data that corresponds to the definitive truth or the correct answer that the model should ideally learn to predict or replicate. The training dataset comprises multiple datapoints, each datapoint comprising one or more input values for independent variables on which a target label or value (i.e., the dependent variable) is to be predicted. A training datapoint is also associated with ground truth information, where the ground truth information includes information identifying the target label or value for that datapoint.

As part of the training, the values of the model parameters are updated as the model learns how to accurately map a set of inputs (e.g., training datapoints, input features representing independent variables) to one or more labels or target variables. At the start of the training, the model parameters of the model being trained are initialized to some initial values. These initial values are then updated as the training progresses using an optimization algorithm (e.g., back propagation using gradient descent). The values of the model parameters thus change as part of the training. Training typically is performed until the accuracy of the model being trained meets or exceeds some desired threshold value. At the end of the training, the values determined for the model parameters become part of and define the trained model.

As part of the training process, the training and learning process itself is controlled using configuration information represented by a set of parameters referred to as hyperparameters. The values assigned to these hyperparameters are referred to as hyperparameter values. Unlike model parameters, hyperparameters are external to the model being trained (i.e., are not part of the model), but instead control the training and learning process. Since the hyperparameters and their assigned values control the learning process, they impact the values of the model parameters for a model being trained, which in turn impacts the performance (e.g., accuracy) of the model. As a result, identifying the right set of hyperparameters and associated hyperparameter values is an important aspect of any ML model training. Some examples of hyperparameters include learning rate, regularization parameters, number of epochs, batch size, number of lag observations. The specific hyperparameters in use varies from one ML model to another.

Typically, at the start of model training, a data scientist selects a set of hyperparameters and assigns corresponding hyperparameter values to be used for the training. The model is then trained using the assigned hyperparameter values and the training dataset. Such an execution is referred to as a trial. During the training, the values of the model parameters change as the model learns to better map the inputs to the target labels or values. However, the values of the hyperparameters do not change during a trial.

Since the hyperparameter values influence the performance of the ML model being trained, as part of the training process, processing is performed to attempt to identify the right combination of hyperparameter values to use for the training, where the combination maximizes the performance of the resultant trained model. This processing is referred to as hyperparameter optimization. Hyperparameter optimization involves tweaking the hyperparameter values with the goal of improving the performance of the resultant trained ML model. For example, multiple training trials are run using the same training dataset but with different combinations of hyperparameter values to see which particular combination of hyperparameter values results in a trained model that gives the best performance. Certain tools such as Optuna are available for performing hyperparameter optimization.

However, existing techniques generally fail to take into account constraints resulting from limited time and computing resources. Put differently, existing techniques may make arbitrary assumptions about the amount of time available for hyperparameter optimization given or the availability of unlimited computing resources. The available computing resources define roughly how long a trial takes to complete as well as capabilities like parallelization, extra CPUs/GPUs, scaling, etc. Thus, if a typical trial on a given computing device takes 1 hour to execute on a certain high-end computing resource configuration, and 100 trials are needed to achieve a desired level of ML model performance, then 100 hours of computing time will be needed. Computing time can be simply reduced through parallelization or adding even more server resources.

In practical applications, however, the constraints work the other way around. A data scientist may be given 5 hours to perform hyperparameter optimization and no more. Likewise, a particular allocation of computational resources may be available during those 5 hours. For example, a subscription-based cloud computing tool may be used for ML model development by data scientists with a limited budget. The problem, under these circumstances, is how to determine the optimized hyperparameters given the available time and the available computing resources relative to the budget.

The present disclosure relates to optimized hyperparameter tuning given a specified time bound. More specifically, techniques are described that enable the determination of optimized hyperparameters for an ML model given a specified time bound using a three-stage approach. This is achieved by executing a series of trials, during each of which the ML model is trained using a distinct set of hyperparameter values. For example, the techniques can be used to model time series data to make forecasts about future trends based on the past. During each trial, a forecasting model is fit to the training data and its performance can be tested against ground truth data.

In the first stage, a small number of trials are executed to initialize the algorithm. In the second and third stages, a number of trials are executed in each stage respectively. The number of trials to run in each stage is determined using one or more computer-implemented techniques. The computer-implemented techniques can also be used to narrow the hyperparameter search space and the feature space between the second and third stages. Following the third stage, a set of optimized hyperparameter values is adopted based a predefined optimization criterion like minimization of an error function. The use of the one or more computer-implemented techniques can thus be used to optimize the hyperparameters given a block of time and specific computing resources.

In one example, the computer-implemented techniques are based on the golden ratio. The golden ratio (F) is a mathematical constant approximately equal to 1.618 that appears throughout nature and physics. Among many definitions, it can be simply geometrically defined as the ratio of a line segment cut into two pieces of different lengths such that the ratio of the whole segment to that of the longer segment is equal to the ratio of the longer segment to the shorter segment. In this example, the golden ratio is used to determine the various quantities that structure the three-stage approach. As they are related by the golden ratio, the quantities can be conveniently determined using Fibonacci numbers.

In this example, the algorithm is framed by the time available for ML model training. In the first stage, which will be referred to as the initialization stage, the approximate time a trial takes to execute is estimated. For instance, the average time to execute a small number of initial trials can be calculated to determine the approximate time a trial takes to execute.

Importantly, the initial trials are executed in the full hyperparameter search space and full feature space. In other words, in the initialization stage, no attempt is made to reasonably limit the hyperparameter values that can be assigned to the hyperparameters. As a result, the search space for each hyperparameter can be vast, spanning decades of orders of magnitude.

Likewise, the feature space is not limited during the initial trials. The feature space refers to the multi-dimensional space composed by the set of features or characteristics (i.e., dependent variables) used describe the training data. Each feature represents a dimension in this space, and a specific instance of data is represented as a datapoint within this space. In the initialization stage, the feature space includes all of the features identified during training data preprocessing, including features that may be more or less relevant to the phenomena being modeled. For example, while modeling time series data, lagged features that have been delayed by a certain number of time steps can be engineered. In other words, lagged features represent past values of the time series, which can be used to capture temporal dependencies in the training data. All time steps of each lagged feature make up the full feature space for time series data.

The approximate time to complete a trial is then used to estimate the number of trials that can be executed in the available time, which is known as the approximate number of trials. For example, the time available for ML model training can be simply divided by the approximate time a trial takes to execute to estimate this number. Corrections to the approximate number of trials can then be made by, for example, accounting for trials already run or testing or validation that needs to be performed following hyperparameter optimization.

In this example, the corrected approximate number of trials that can be executed is then used to solve an equation involving the golden ratio. The golden ratio is related to the Fibonacci sequence. The Fibonacci sequence is a series of numbers in which each number is the sum of the two preceding ones. For example, the first few numbers of the Fibonacci are 1, 1, 2, 3, 5, 8, 13, 21, 34, 55, 89, and so on. The ratio of two consecutive Fibonacci numbers tends to approximate the golden ratio. For example, 5/3=1.63, 8/5=1.6, 18/8=1.625, etc.

The solution to this equation is used to determine a first Fibonacci number. The first Fibonacci number, along with the two Fibonacci numbers preceding it (the second and third Fibonacci numbers) are then used to define how many of and in what search space the remaining trials will be executed.

In this example, the first Fibonacci number is used to define the number of trials that will be run using the full hyperparameter search space and full feature space, including the initial trials. So, for instance, if the first Fibonacci number is 34 and 3 trials were executed during the initialization stage, then 34–3=31 trials remain to be executed using the full hyperparameter search space and full feature space. This second stage during which the trials thus defined are executed is referred to as the full search space stage.

During the full search space stage, a distinct set of hyperparameter values is selected before each trial. The hyperparameter values can be selected using any suitable method, but the techniques disclosed herein are most effective when combined with efficient hyperparameter value selection algorithms. For instance, some examples may use Bayesian optimization to select hyperparameter values for the next trial, given all that is known about the previous trials up to that point. In Bayesian optimization, a probabilistic surrogate model can be constructed based on past trial results. The probabilistic surrogate model can be used to decide which hyperparameter values to use in the next trial based on what is known about the performance from previous trials.

Following execution of the trials included in the full search space stage, the second Fibonacci number is used to define the number of "top trials" to use to determine a reduced hyperparameter search space and reduced feature space. A reduced hyperparameter search space refers to a more narrowly bounded hyperparameter search space. If, for instance, a hyperparameter was bounded over 20 orders of magnitude in the full search space stage, it may be narrowed to span only 3 orders of magnitude during the third stage, referred to as the reduced search space stage.

In this example, to determine the reduced hyperparameter search space, a number of trials executed during the full search space stage equal to the second Fibonacci number are selected. For example, if the first Fibonacci number was 34, the second Fibonacci will be 21. Thus, 21 top trials are selected and used as the basis for selecting the bounds that will be placed on hyperparameter value variability during the reduced search space stage.

In addition to narrowing the hyperparameter search space, the top trials selected using the second Fibonacci number are also used to narrow the feature space. For example, a tool like LightGBM can be used to narrow the feature space using a feature importance algorithm. In the example of time series forecasting, the feature importance algorithm may reduce the number of lagged features being modeled in one or more of the independent variables.

Given the reduced hyperparameter search space and reduced feature space, the third Fibonacci number is used to define the number of trials to run in the third, reduced feature space stage. For instance, if the first Fibonacci number was 34, the second Fibonacci is 21, and the third Fibonacci number will be 13. Thus, in this example, 13 trials are run in using the reduced hyperparameter search space and reduced feature space.

Following execution of the trials in the reduced search space stage, the time available for ML modeling has expired and the optimized hyperparameter values can be identified based on the outcome of the trials executed using the reduced hyperparameter search space and reduced feature space. For example, the performance of the ML model resulting from these trials can be quantified according to a particular performance metric. For instance, optimized performance can be defined as the trial executed during the reduced search space stage that maximized accuracy or that minimized the mean squared error, among other possible metrics. The hyperparameter values from the trial with optimized performance are then designated as the hyperparameter values for the ML model. In some examples, the ML model may be trained once again using a larger training dataset than was used during hyperparameter optimization to establish the final ML model parameters. The model can then be exported for use in production, including the optimized hyperparameter values.

The teachings described in this disclosure may be offered as services by a cloud services provider (CSP). A CSP may offer one or more cloud services to subscribing customers on demand (e.g., via a subscription model) using infrastructure provided by the CSP. The CSP-provided infrastructure is sometimes referred to as cloud infrastructure or cloud services provider infrastructure (CSPI). The CSPI provided by a CSP may include a collection of services that enabled users to develop ML models given sets of training data provided by the user. For example, one use case involves time series training data that may be provided to the CSP service for the purpose of generating a forecasting model. In some examples, the CSP service can determine which forecasting ML model best describes the training data provided. Typical forecasting models include Autoregressive Integrated Moving Average (ARIMA) models, Long Short-Term Memory (LSTM) neural networks, or exponential smoothing models, among many others. Thus, the CSPI makes it possible for users to easily generate forecasting and other kinds of ML models given a set of training data.

The hyperparameter optimization functionality described herein may be offered as a cloud service by a CSP coupled with the model generation functionality. The hyperparameter optimization cloud service can be subscribed to by a customer as part of the suite of services offered by the CSP. Using the subscribed hyperparameter optimization cloud service, users have the ability to obtain optimized hyperparameter values along with a trained ML model given a set of training data using the techniques described in the present disclosure.

The techniques described in this disclosure present several technical improvements over existing techniques for users of CSPI. Prior to the innovations of the present disclosure, time-bounded hyperparameter optimization was typically not considered by the developers of ML model training techniques. Hyperparameter optimization was an operation typically performed only once for a given ML model with an assumption of unlimited time. Given the resources of a CSPI, it is now possible to train an ML model over even an expansive training data set in a relatively short period of time. Thus, the techniques of the present application focus on a novel technical problem only recently surfaced with the advent of high-performance hyperparameter optimization enabled through CSPIs: making optimized use of the time available for hyperparameter optimization given the CSP user's expectation of a fully-trained and optimized ML model in a short period of time (e.g., 4 hours) given a constrained budget. The techniques of the present disclosure provide a model-agnostic, staged approach to utilizing every minute of the available time. Moreover, the novel techniques of the present disclosure operate in parallel with existing techniques since they are geared towards solving different problems. Hyperparameter optimization relates to the problem of identifying the optimized hyperparameter values given unlimited time, where the present techniques relate to optimizing the use of the available time given a time constraint. For instance, while Bayesian optimization can be used with the techniques disclosed herein, in some examples, selection of hyperparameter values randomly or using another algorithm might result in the optimized hyperparameter values. The techniques of the present disclosure also include the reduction of the hyperparameter search space and feature space, which provide information to the CSP user that may be useful in another context.

FIGS. 1-8 and the accompanying description below describe examples and embodiments related to the improved techniques described in this disclosure. FIGS. 9-13 depict examples of architectures for implementing cloud infrastructures for providing one or more cloud services, where the infrastructures may incorporate teachings described herein.

Time-Bound Hyperparameter Tuning

FIG. 1 depicts a simplified block diagram of an example forecasting system 100 for time-bound hyperparameter tuning, according to certain embodiments. The system 100 includes a trained machine learning (ML) model 120 that may be trained using optimized hyperparameter values 125 determined using the techniques of the present disclosure.

The forecasting system 110 is configured to develop ML models that represent time series data 105. For example, given time series data 105, the forecasting system 110 can generate a trained ML model 120 that can be used to generate forecast 130, which may include predictions of future time series values.

Forecasting system 110 includes model generation system 115. Model generation system 115 includes components used for the generation of trained ML model 120. For example, model generation system 115 includes training and optimization subsystem 135. Training and optimization subsystem 135, as will be described in detail in the description accompanying FIG. 2, may include components for training and optimization of ML models, including training, validation, hyperparameter optimization, modifying the hyperparameter search space, and modifying the feature space, among others.

In a typical application of forecasting system 110, forecasting system 110 receives time series data 105 in a format suitable for processing by model generation system 115. For example, time series data 105 may be received in a structured format such as a comma-separated values (CSV) file or an Excel or other spreadsheet file. Time-series data 105 may be organized in timestamped rows with various associated attributes or metrics, such as sales figures, temperature readings, or stock prices, depending on the specific forecasting task. The time-series data 105 can take other formats, however, including data downloaded directly from a database or application programming interface (API) with suitable timestamping for forecasting applications.

The time-series data 105 is received by model generation system 115. Model generation system 115 may have various subsystems for preprocessing, feature extraction, and other operations that may be performed before training and optimization of the ML model begins. Following preprocessing and other prerequisite steps, the time-series data 105 is received by training and optimization subsystem 135 in which operations such as training, validation, hyperparameter optimization, modifying the hyperparameter search space, and modifying the feature space may be carried out.

In one example, the outputs of model generation system 115 include a trained ML model 120 and optimized hyperparameter values 125. The optimized hyperparameter values 125 may be used to train the trained ML model 120 one or more additional times using different portions of the time series data 105 than that used to generate the optimized hyperparameter values 125 to prevent overfitting or to provide a means for testing on new (i.e., never previously seen by the model during training) data.

The trained ML model 120 can be used to generate a forecast 130. For example, the trained ML model 120 may be cast in a functional form, like a mathematical equation with coefficients determined during training. In such a form, the independent variables may be past times and the predicted, dependent variables may be various values at future times. The trained ML model 120 can thus use past times from time series data 105 and generate forecast 130 including future predictions of various values. In some examples, the forecast 130 can be updated continuously as new time series data 105 is received once the trained ML model 120 is available.

FIG. 2 depicts a simplified block diagram of an example forecasting system 200 for time-bound hyperparameter tuning, according to certain embodiments. Example forecasting system 200 includes model generation system 115, which includes various components used during selection, training, and validating a ML model. The components of model generation system 115 are orchestrated by controller 220. Controller 220 manages the operational workflow of the model generation system 115 from ingestion of time series data 105 to output of trained ML model 120. Controller 220 coordinates the activities of the system components, like the selection of appropriate models based on manual selection or automatically based on predefined criteria, initiation of training processes with the received time series data and overseeing the model validation process. Controller 220 may include interfaces for communication with external services and systems. System 200 depicts the components of model generation system 115 hosted together, but some implementations may be based on a distributed architecture. In some examples, controller 220 may include configurations including the network locations of the components of model generation system 115.

Model generation system 115 can be operated, for example, by way of user device 205. User device 205 may include a desktop computer, laptop, tablet, smartphone, dedicated server hardware, and so on. User device 205 may include one or more display devices and one or more input devices for operation of the model generation system 115. For example, user device 205 may include a graphical user interface (GUI) that can be used to input such parameters as the location of time series data 105, the selection of an ML model, specification of trials rules and logic 260, and so on.

Model generation system 115 may receive time series data 105 from an external source. Because time series data 105 may be large (e.g., gigabytes or terabytes of data), many implementations include a means for specifying a network location for the time series data 105. For example, time series data 105 may reside on a network drive or cloud storage provider. In another example, time series data 105 may be available from a web application programming interface (API). In that example, the location of time series data 105 may be specified using a uniform resource locator (URL). Similarly, time series data 105 can be "pushed" to model generation system 115 using WebSockets, webhooks, or other suitable mechanism.

The time series data 105 represents a set of observations obtained sequentially over time. Time series data 105 may be structured in chronological order in a standardized, tabular format like comma separated values (CSV), tab separated values (TSV), Excel, exported database tables, and so on. The time series data 105 may have a number of columns representing dependent and independent variables (i.e., features). Typically, the first column represents a chronological time variable specified using a timestamp or date. In some examples, time series data 105 may include additional metadata, error estimates, or other ancillary information.

In some examples, time series data 105 may be partitioned into at least three parts including a training dataset, a validation dataset, and a test dataset. The training dataset is typically the largest portion and can be used adjust the ML model's parameters in response to ML model performance during training using a feedback mechanism typically related to a loss function. The validation dataset may be used during hyperparameter optimization to prevent overfitting. Overfitting may occur when a trained ML model 120 is too closely coupled with the specifics of the training dataset. The test dataset can be used to test the final performance of the trained ML model 120, including training following the determination of optimized hyperparameter values 125 using the techniques of the present disclosure. To maintain the temporal order and dependencies in the time series data 105, the time series data 105 can be partitioned into contiguous segments.

Upon receipt of time series data 105, the data preprocessing subsystem 210 prepares the time series data 105 for use in training and forecasting. The data preprocessing subsystem 210 may perform a number of functions to ensure the time series data 105 is properly processed by training and optimization subsystem 135. A typical function involves data cleaning or hygiene. For instance, the data preprocessing subsystem may implement processes for adding or correcting missing values, identifying and correcting any obvious errors or inconsistencies in the data, and so on. Another typical function relates to normalization or standardization, in which some numerical values may be scaled for sensible comparisons and for faster model convergence. Other typical function in some embodiments include sequence creation, data splitting (as described above), variable encoding, and others. The preprocessing steps needed may vary according to the specific ML model in use and the particulars of the time series data 105.

The preprocessed time series data 105 is sent to feature extraction subsystem 215. For time series data 105, features might be extracted that describe trends, seasonality, or other patterns in the data. This can also include creating lagged features, which are values from prior time steps. For example, a sales model may be predicated on the assumption the sales on a certain future day could be influenced by the sales on the previous days or weeks. Lagged features ensure that the ML model can take into account the temporal ordering of the observations during training, as well as capturing dependencies or autocorrelations in time series data. Feature extraction subsystem 215 may determine how many lagged features (i.e., how many time steps back from the most datapoint under examination) to use during training.

Following feature extraction the model generation system 115 may retrieve model data 255 based on a model selection made by user device 205 or automatically following feature extraction. In some embodiments, the model generation system 115 may recommend a suitable ML model based on the characteristics of the extracted features. The model recommendation may be generated based on predefined rules, statistical measures, or an ML model trained to recommend ML models.

The trials computation subsystem 230 is initialized with the time available for hyperparameter optimization ($T_{avail}$). Upon receipt of $T_{approx}$ from the hyperparameter optimization subsystem 235, discussed below, the trials computation subsystem 230 can determine the number of trials for the full search space stage 325, reduced search space stage 330, and the number of top trials to use as a basis for determining the reduced search space and reduced feature space. Thus, the implementation of the first and second computer-implemented methods as discussed in FIGS. 5A-B may be included in trials computation subsystem 230.

Trials computation subsystem 230 may include a memory device for ephemeral retention of the computed trial parameters for a given ML model training session. For example, for a particular set of time series data 105 to be used for development of a trained ML model 120 and optimized hyperparameter values 125, a session may be generated associated with a unique ID or other identifier. Following preprocessing, feature extraction, model selection, and determination of $T_{approx}$, the numbers that will be used during hyperparameter optimization like $N_{search}$, $N_{top}$, and $N_{reduced}$ may be determined and saved in an in-memory value store or other suitable memory device for querying by the components of training and optimization subsystem 135 during hyperparameter optimization. Following the completion of training and hyperparameter optimization, the session information and values may be deleted. However, in some examples, the values may be persistently stored for future analysis.

Trials computation subsystem 230 may receive information relating to the trials including trials rules and logic 260. Trials rules and logic 260 may include business rules and related logic that define the first and second computer-implemented methods that define the structure of the three-stage approach to hyperparameter optimization described in the present disclosure. The present application uses an example wherein the trials rules and logic 260 are based on the Fibonacci sequence and the golden ratio, but other approaches may be possible. Such alternative approaches could be encoded in the trials rules and logic 260.

Trials rules and logic 260 may be configurable using user device 205 prior to commencement of training and hyperparameter optimization. Trials rules and logic 260 may be provided in any suitable format usable by the components of training and optimization subsystem 135 or trials computation subsystem 230. For instance, trials rules and logic 260 may be provided as a script or similar means for conveying program code.

Example system 200 includes training and optimization subsystem 135. Training and optimization subsystem 135 includes components for generation of trained ML model 120 given time series data 105, model data 255, and trials rules and logic 260 as input. In a typical use case, the training and optimization subsystem 135 receives the preprocessed time series data 105 along with metadata relating to the training process like the outputs of the feature extraction subsystem 215, trials computation subsystem 230, the selected ML model, and trials rules and logic 260. The components of training and optimization subsystem 135 then train the ML model, perform hyperparameter optimization, validate the ML model, and output the trained ML model 120 and optimized hyperparameter values 125.

Training and optimization subsystem 135 includes training and validation subsystem 232. The training and validation subsystem 232 trains the ML model selected at 255 using the preprocessed time series data 105. In some examples, only a training portion of the time series data 105 is used for this operation. The time series ML model can be trained using a variety of techniques. For example, the time series ML model can be trained using linear regression, a support vector machine (SVM), a neural network, or other techniques. Some embodiments can train the ML model using ML training tools like LightGBM, TensorFlow, PyTorch, XGBoost, Prophet, and so on. The model generation system 115 provided by the CSP may provide a variety of options for training the ML model that can be configured using user device 205.

Training and validation subsystem 232 also validates the trained ML model 120 after training. ML model validation may be performed using a validation portion of the time series data 105. The validation portion of the time series data 105 may be used for hyperparameter tuning and optimization. ML model validation may also be performed to reduce the risk of overfitting or ensuring that the ML model can also generalize to unseen data beyond the training portion of the time series data 105. During validation, the trained ML model 120 may be used to make predictions about future times, which can then be compared against the ground truth values. Standardized error measurements such as accuracy, recall, or mean squared error may be used to detect overfitting and other failures during training.

Training and optimization subsystem 135 includes hyperparameter optimization subsystem 235. Hyperparameter optimization may occur in parallel with training of the ML model. Hyperparameter optimization subsystem 235 can perform the techniques of the present disclosure using the time series data 105 and the output of the trials computation subsystem 230 to structure the 3 stage approach to hyperparameter optimization described in detail in the flowcharts following the description of this figure.

Hyperparameter optimization includes a series of trials, wherein each trial consists of training the ML model to completion using the time series data 105 or a portion thereof. During each trial, the ML model can be trained using a distinct set of hyperparameter values. In the first stage, a small number of trials are executed to initialize the algorithm. These trials are used to determine the approximate time ($T_{approx}$) to execute a single trial. $T_{approx}$ is a function of the volume of time series data 105, the complexity of the ML model selected, and the computational resources available, among some other factors. $T_{approx}$ is sent to trials computation subsystem 230 for the determination of configuration values used in the next two stages.

In the second and third stages, a number of trials are executed in each stage respectively. The number of trials to run in each stage are determined using one or more computer-implemented techniques, as performed by the trials computation subsystem 230. The computer-implemented techniques can also be used to narrow the hyperparameter search space and the feature space between the second and third stages. Following the third stage, a set of optimized hyperparameter values 125 is adopted based a predefined optimization criterion like minimization of an error function. The error function, sometimes referred to as a loss function, quantifies the difference between the predicted and actual values in a machine learning model. Typically, hyperparameter optimization is configured to minimize this function, thereby improving the model's accuracy. Examples of error functions for time series forecasting may include the mean squared error (MSE), mean absolute error (MAE), and others.

In one example, the computer-implemented techniques are based on the golden ratio. The golden ratio is used to determine the various quantities that structure the three-stage approach. As they are related by the golden ratio, some related quantities can be conveniently mapped to certain Fibonacci numbers.

Hyperparameter optimization may be performed using tools like Optuna, Scikit-Optimize, GridSearchCV from scikit-learn, Hyperopt. among other possibilities. In this context, these tools may be used for the selection of hyperparameter values before trials based on configurations chosen to maximize efficiency in identifying the optimized hyperparameter values. For example, the tools may use Bayesian optimization to select the hyperparameter values for the next trial. In some examples, the initial hyperparameter values (i.e., the hyperparameter values used in the first trial) may be randomly selected.

Training and optimization subsystem 135 includes feature space reduction subsystem 240. Feature space reduction may be performed in between the second and third stages. Typically, feature space reduction can be performed using a tool like LightGBM or a similar gradient boosting framework or other suitable framework. Using LightGBM, feature importance tools can be used to perform the feature space reduction. For example, following a trial, the tool may output a measure of how much each feature contributed to the predictions. Based on these importance scores a subset of the features can be selected, effectively reducing the dimensionality of the feature space. In some examples, the feature importance output of a number of top trials is used for feature space reduction.

Training and optimization subsystem 135 includes hyperparameter search space reduction subsystem 245. In some examples, the hyperparameter optimization tools mentioned above also receive as input bounds for the hyperparameter values. In some examples, the bounds may be infinite or essentially infinite for the first and second stages (i.e., the full search space stage 325) and closely bounded during the third stage (i.e., the reduced search space stage 330). The selection of the new bounds for the reduced search space stage 330 is referred to as hyperparameter search space reduction. In general, the results of previous trials are used to limit the bounds for future trials. Limited bounds mean a smaller parameter space to explore during future trials, which can increase the probability of determining the highly optimize hyperparameters. In some examples, the hyperparameter values taken from a number of top trials is used for hyperparameter search space reduction. One example method for performed hyperparameter search space reduction is given in FIG. 7 and the accompanying description.

Model generation system 115 outputs trained machine learning model 120 and optimized hyperparameter values 125. The trained ML model 120 may have been trained using a training portion of the time series data 105 and then trained one or more additional times for validation or for training using the optimized hyperparameter values 125. In most cases, the trained ML model 120 may be ready for use in forecasting. The optimized hyperparameter values 125 may be used for subsequent training of the trained ML model 120 if, for example, new training data is obtained.

FIG. 3 depicts a simplified flowchart showing a method 300 for time-bound hyperparameter optimization techniques, according to certain embodiments. The method 300 depicted in FIG. 3 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method 300 presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order, or some steps may also be performed in parallel.

One or more of the processing steps depicted herein may be performed or facilitated by an implementation of the training and optimization subsystem 135 included in the model generation system 115 or other components. At 305, the total time total time available ($T_{avail}$) for training an ML model using a training dataset is obtained. For instance, in the context of a forecasting service provided by a CSP, a CSPI user may be allocated a particular block of time and/or computing resources for the generation of a forecasting model. $T_{avail}$ may include time available for all aspects of model generation such as preprocessing, training, hyperparameter optimization, and so on. In some examples, training and hyperparameter optimization may occur in parallel. In other examples, training and hyperparameter optimization may occur in sequence. For instance, hyperparameter optimization may be performed first. Once optimized hyperparameter values 125 are available, the trained ML model 120 may be trained one final time using the optimized hyperparameter values 125. In any case, $T_{avail}$ includes each step leading to the final trained ML model 120 output from the model generation system 115 of the forecasting system 110.

At 310, the model to be trained is selected. For example, the forecasting system 110 provided by the CSP may include a number of time series models that can be used to model the time series data 105. In some examples, the forecasting system 110 may include components for automatically selecting an ML model based on an analysis of the input time series data 105. In some examples, the user can specify a particular ML model to use. A non-limiting list of time series ML models that may be used to model time series data 105 include, among others, exponential smoothing models, an AutoRegressive Integrated Moving Average (ARIMA) model, or Long Short-Term Memory (LSTM) neural networks, among others.

At 315, a set of hyperparameters to be optimized is identified. The hyperparameters typically may vary among the ML model selected in 310. For example, common hyperparameters for neural networks include the number of layers, the number of units in each layer, the learning rate, the type of optimizer, batch size, among others. In another example, an ARIMA model may have three hyperparameters including the number of lags of a variable to be included in the model, the number of differences required to make the series stationary, and the number of lagged forecast errors to consider. A lag may refer one or more time series data points preceding each data point used during modeling. In another example, exponential smoothing models may include hyperparameters such as smoothing factors.

The next three blocks represent the three stages of time-bound hyperparameter optimization in some examples. Each stage is in a dotted block to indicate that more details are shown in subsequent figures. Block 320 is the initialization stage. Block 325 is the full search space stage. Block 330 is the reduced search space stage. In general, during the initialization stage 320, a small number of trials are executed to initialize the algorithm. In the full search space stage 325, a number of trials are run using the full hyperparameter search space and the full feature space. During the reduced search space stage 330, a number of trials are run using the reduced search space and the reduced feature space. Following the reduced search space stage 330, a set of optimized hyperparameter values 125 is output from the model generation system 115.

At 340, a trained ML model 120 and an optimized set of hyperparameter values 125 are output. In some examples, hyperparameter optimization may be performed first. Once optimized hyperparameter values 125 are available, the trained ML model 120 may be trained one final time using the optimized hyperparameter values 125. The trained ML model 120 may include information about the selected ML model and the parameters that define the trained ML model 120. For example, a trained exponential smoothing model may be compactly represented by a level parameter, a trend parameter, and a smoothing parameter. Likewise, an ARIMA model may be compactly represented by the coefficients of the autoregressive and moving average terms, respectively. In that example, the number of such terms may be defined by one or more optimized hyperparameter values 125. The output may include the optimized hyperparameter values 125 that can be used for subsequent training of the trained ML model 120.

At 345, the trained ML model 120 and the optimized set of hyperparameter values 125 are used to make a prediction. Given the parameters defining a particular trained ML model 120, the trained ML model 120 can be used to make a prediction. The predictions possible may vary among trained ML models 120. For example, given the level parameter, trend parameter, and smoothing parameter of an exponential smoothing model, a prediction can be made of the next data point in the series. In some examples, an exponential smoothing model can predict multiple data points into the future.

FIG. 4 depicts a simplified flowchart showing a method 400 for time-bound hyperparameter optimization techniques, according to certain embodiments. The method 400 depicted in FIG. 4 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method 400 presented in FIG. 4 and described below is intended to be illustrative and non-limiting. Although FIG. 4 depicts the various processing steps occurring in a particular sequence or order, this is not intended to be limiting. In certain alternative embodiments, the processing may be performed in some different order, or some steps may also be performed in parallel.

One or more of the processing steps depicted herein may be performed or facilitated by an implementation of the training and optimization subsystem 135 included in the model generation system 115 or other components. FIG. 4 depicts the steps for an example implementation of initialization stage 320 in detail. At 410, the training and optimization subsystem 135 executes a number of initial trials ($N_{initial}$). $N_{initial}$ may be a small number of trials as compared with the total number of trials that will be executed during $T_{avail}$.

Each of the $N_{initial}$ trials is executed with a distinct set of hyperparameter values. A suitable method for choosing each set of distinct hyperparameter values can be used. For example, the hyperparameter values may be chosen randomly. As discussed above, however, choosing hyperparameter values in this way is both inefficient and fails to utilize information about the performance of previous trials. Thus, in some examples, methods for hyperparameter value selection may used that incorporate information about the performance of previous trials like Bayesian hyperparameter optimization. A tool like Optuna may be used for this purpose. Note that the $N_{initial}$ trials are valid trials that are candidates for, for example, narrowing of the hyperparameter search space. Thus, the $N_{initial}$ trials generate useful information for the overall hyperparameter optimization process in addition to initializing the process described herein.

At 415, the training and optimization subsystem 135 determines, based upon the number of initial trials executed in 410, an approximate time ($T_{approx}$) for each trial. For example, the time to execute for each trial can be determined and those times averaged to determine $T_{approx}$. Other means for determining $T_{approx}$ may be suitable as well such as taking the median or geometric mean. If substantial variation in the time to execute among the $N_{initial}$ trials is noted, additional initial trials may be performed and $N_{initial}$ appropriately incremented, to increase statistical confidence in $T_{approx}$.

At 420, the training and optimization subsystem 135 determines, based upon $T_{avail}$ obtained in 305 and $T_{approx}$ determined in 415, an approximate number of trials ($N_o$). $N_o$ corresponds to the number of trials that can be executed in the remaining time, accounting for all operations relating to generation of the trained ML model 120 and the optimized hyperparameter values 125. For example, if 5 hours of computing time total are available, $N_o$ could be established by subtracting time for preprocessing, extra time for ML model validation, the time to execute the $N_{initial}$ trials, and so on.

The remaining time $T_{avail}$ can be divided by $T_{approx}$ to establish $N_o$, or the total number of trials that can be run in the remaining time (with any search space). For example, if 5 hours of computing time are available, 1 hour could be subtracted for preprocessing and feature generation, leaving 4 hours. If $T_{approx}$ is 15 minutes or 0.25 hours, then 4 hours/0.25 hours=16. If $N_{initial}$ was 3 (i.e., 3 trials of approximately 0.25 hours each), then this number can be further reduced by 3 to obtain 13. In some examples, some additional time (i.e., extra trials) are set aside for ML model validation, like cross-validation. For example, 3 trials may be set aside for this purpose, leaving $N_o$=10. These values are just examples intended to illustrate that $N_o$ should be calculated by removing from $T_{avail}$ all other consumers of computing time besides the trials that will be executed during the full search space stage 325 and the reduced search space stage 330.

FIGS. 5A-B depict a simplified flowchart showing a method 500 for time-bound hyperparameter optimization techniques, according to certain embodiments. The method 500 depicted in FIGS. 5A-B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method 500 presented in FIGS. 5A-B and described below is intended to be illustrative and non-limiting. Although FIGS. 5A-B depict the various processing steps occurring in a particular sequence or order, this is not intended to be limiting. In certain alternative embodiments, the processing may be performed in some different order, or some steps may also be performed in parallel.

One or more of the processing steps depicted herein may be performed or facilitated by an implementation of the training and optimization subsystem 135 included in the model generation system 115 or other components. FIG. 5 depicts the steps for an example implementation of the full search space stage 325 in detail. At 505, the training and optimization subsystem 135 determines, using a first computer-implemented technique and based upon $N_o$ identified in 420, a first number of first trials ($N_{full}$) to be executed using the full search space and feature set. Recall that $N_o$ corresponds to the number of trials that can be executed in the remaining time. In some examples, the number $N_o$ is used as input to the first computer-implemented technique that generates $N_{full}$.

For example, a simple example of the first computer-implemented technique may involve multiplying $N_o$ according to a predefined ratio. For instance, $N_{full}$ could be defined as ⅓ of $N_o$ according to empirical testing or other criteria. In another example, as will be more fully discussed in FIG. 6A and the accompanying description, the golden ratio and the Fibonacci sequence can be used in concert with $N_o$ to determine $N_{full}$. The first number of first trials, $N_{full}$, includes all of the trials that are executed using the full hyperparameter search space, including both the initial trials and the trials to be executed during full search space stage 325, as discussed in 510.

At 510, the training and optimization subsystem 135 determines a number $N_{search}=N_{full}-N_{initial}$ of trials to execute in the full search space stage 325. As just mentioned, the number $N_{search}$ is the number of trials that will be executed during the full search space stage 325 using the full search space and full feature space. The number $N_{search}$ is obtained by subtracting $N_{initial}$ from $N_{full}$, as determined in 505.

At 515, the training and optimization subsystem 135 executes $N_{search}$ trials using the full search space and feature set, each with a different combination of hyperparameter values. Executing a trial includes training the ML model using the training data or a subset thereof to completion. For example, hyperparameter optimization may be performed using a validation subset of the time series data 105.

In some examples, a hyperparameter optimization tool like Optuna can be used to serially train the ML model, using a different combination of hyperparameter values at each trial. A strategy for choosing the hyperparameter values for each trial can be chosen according to a particular method. For example, the hyperparameter values may be chosen randomly. As discussed above, however, choosing hyperparameter values in this way is both inefficient and fails to utilize information about the performance of previous trials. Thus, in some examples, methods for hyperparameter value selection may used that incorporate information about the performance of previous trials like Bayesian hyperparameter optimization. Tools like Optuna and other suitable tools may include implementations of Bayesian hyperparameter optimization algorithms that can be used to explore the hyperparameter search space efficiently.

Importantly, the full hyperparameter search space is used during block 515. This may involve specifying large or maximal bounds for each hyperparameter. For example, the hyperparameter optimization tool may require, as an input, specification of a range for each hyperparameter. For instance, each hyperparameter may be specified in accordance with the particular ML model, along with a minimum and maximum possible value that the hyperparameter value can assume during hyperparameter optimization. Because a completely unbounded range may be computationally intractable, some examples may specify a large, empirically derived range that may be orders of magnitude less than and greater than any expected optimized hyperparameter value. In some examples, the hyperparameter range may be determined by a mathematical constraint of the specific ML model or limitation of the system 100.

At 520, the training and optimization subsystem 135 determines a number of top trials ($N_{top}$) to select from the trials executed in 410 and 515. For example, $N_{top}$ can be simply chosen using a predefined or empirically derived percentage. In another example, the first computer-implemented technique can be used to determine $N_{top}$ as will be discussed in detail in FIG. 6B and the accompanying description. In that example, the golden ratio and the Fibonacci sequence are used to determine $N_{top}$.

At 525, the training and optimization subsystem 135 identifies the top $N_{top}$ trials, from the trials executed in 410 and 515. Given the number $N_{top}$, that number of "top trials" are identified from among all trials run during the initialization stage 320 ($N_{initial}$ trials) and the full search space stage 325 ($N_{search}$ trials). The number of top trials may be identified by ranking the performance of the $N_{full}$ trials and selecting the $N_{top}$ top trials from that ranking. The $N_{full}$ trials may be ranked according to a predefined metric that may vary depending on the specifics of the ML model being trained. For example, for modeling time series data 105 for prediction of a continuous value, predefined metrics may include mean absolute error, root mean squared error, or other suitable approach for measuring the error.

At 530, the training and optimization subsystem 135 identifies a reduced set of features based upon the $N_{top}$ trials identified in 525. Put differently, given the subset of the $N_{full}$ trials executed using the full hyperparameter search space and full feature space of size $N_{top}$ determined in block 525, a reduced feature space is now identified. For example, a gradient boosting framework like LightGBM may include a feature importance tool that can be used to reduce the feature space. Such tools may determine feature importance using a suitable algorithm and then compute a score for each feature. The features can be ranked based on their importance scores and a predetermined threshold for inclusion can be used to select the subset of features to designate as the reduced feature space for use during the reduced search space stage 330. For example, 60% of the features may be retained for training during the reduced search space stage 330. Reducing the feature space, particularly in time series modeling, may include such benefits are prevention of overfitting, simplifying model interpretation, and enhance computational efficiency by eliminating redundant or less informative features.

At 535, the training and optimization subsystem 135, based upon the $N_{top}$ trials identified in 525, for at least one hyperparameter in the set of hyperparameters, determines a reduced search space for the hyperparameter, where the reduced search space has a smaller number of values than the number of values in the full search space for that hyperparameter. For example, the hyperparameter values corresponding to the $N_{top}$ trials can be used to select new, reduced bounds for each hyperparameter in future trials during the reduced search space stage 330. A suitable algorithm can be used to determine the new bounds. An example implementation is given in FIG. 7 and the accompanying description.

At 540, the training and optimization subsystem 135 determines, using a second computer-implemented technique, a second number of trials ($N_{reduced}$) to be executed using the reduced set of features identified in 530 and the reduced search space for one or more hyperparameters determined in 535. As in block 505, the number $N_o$ is used as input to the second computer-implemented technique which to generate $N_{reduced}$. For example, as will be more fully discussed in FIG. 6C and the accompanying description, the golden ratio and the Fibonacci sequence can be used in concert with $N_o$ to determine $N_{reduced}$. In some examples, wherein the first and second computer-implemented techniques are the same, the output of the first computer-implemented technique may fully determine $N_{reduced}$.

FIGS. 6A-C depict simplified flowcharts showing methods 600, 622, 642 for time-bound hyperparameter optimization techniques, according to certain embodiments. The methods 600 depicted in FIGS. 6A-C may be implemented in software (e.g., code, instructions, program) executed by one or more processing units (e.g., processors, cores) of the respective systems, using hardware, or combinations thereof. The software may be stored on a non-transitory storage medium (e.g., on a memory device). The methods 600 presented in FIGS. 6A-C and described below are intended to be illustrative and non-limiting. Although FIGS. 6A-C depict the various processing steps occurring in a particular sequence or order, this is not intended to be limiting. In certain alternative embodiments, the processing may be performed in some different order, or some steps may also be performed in parallel.

One or more of the processing steps depicted herein may be performed or facilitated by an implementation of the training and optimization subsystem 135 included in the model generation system 115 or other components. FIG. 6 depicts steps for example implementations several steps of method 500 related to the full search space stage 325.

In method 600, steps for an example implementation of block 505 for determining $N_{full}$ based on $N_o$ using a first computer-implemented method are shown. At 610, the training and optimization subsystem 135 solves the equation $n(1+F^2)=N_o$ for n, where F is the golden ratio represented by $$\frac{1+\sqrt{5}}{2}$$

or about 1.618. For example, if $N_o$ is 10, then n is 2.76. The number n may be a scaling factor that can be multiplied by powers of the golden ratio in order to align the empirically derived available number of trials ($N_o$) with the Fibonacci sequence.

At 615, the training and optimization subsystem 135 determines a first Fibonacci number based upon n determined in 610. For example, the quantity $nF^2$ can be used to define a lower bound for the first Fibonacci number. Given $nF^2$, the first Fibonacci number that is greater than or equal to $nF^2$ can be identified. For example, if $nF^2=7.24$ then the first Fibonacci number is 8. Likewise, if $nF^2=8.01$ then the first Fibonacci is 13. At 620, the training and optimization subsystem 135 sets $N_{full}$ to be the first Fibonacci number determined in 615.

In method 622, steps for an example implementation of block 520 in which the number $N_{top}$ of top trials to be selected is determined are shown. At 625, the training and optimization subsystem 135 determines a second Fibonacci number based upon the first Fibonacci number determined in 615. An example implementation of block 625 is depicted in method 622, including at 630 identifying a Fibonacci number the immediately preceding the first Fibonacci number. For example, if the first Fibonacci number is 13, the second Fibonacci number is 8. At 635, the training and optimization subsystem 135 identifies the Fibonacci number identified in 630 as the second Fibonacci number.

In some examples, the procedure of block 615 can be repeated to determine the second Fibonacci number. In some other examples, the state of the Fibonacci sequence determined in 615 can be ephemerally stored and the next Fibonacci number can be read out. In still other examples, the entire descending Fibonacci sequence may be determined at 615 and ephemerally stored, and Fibonacci numbers can be selected as needed for the present steps as well as subsequent steps as described below. At 640, the training and optimization subsystem 135 identifies the second Fibonacci number identified in 625 as $N_{top}$.

In method 642, steps for an example implementation of block 540 are shown. In block 540, a second computer-implemented technique is used to determine $N_{reduced}$. At 645, the training and optimization subsystem 135 determines a third Fibonacci number based upon the first Fibonacci number determined in 615. An example implementation of block 645 is depicted in method 642, including at 650 identifying a sequence of three consecutive Fibonacci numbers where the first Fibonacci number determined in 615 is the largest Fibonacci number in the sequence. For example, if the first Fibonacci number is 21, then the sequence is 8, 13, and 21, in which the largest Fibonacci number is 21. At 655, the training and optimization subsystem 135 identifies the smallest Fibonacci number in the sequence as the third Fibonacci number. Continuing with the example above, the third Fibonacci number would then be 8. At 660, the training and optimization subsystem 135 identifies the third Fibonacci number identified in 645 as $N_{reduced}$.

FIG. 7 depicts a simplified flowchart showing a method 700 for time-bound hyperparameter optimization techniques, according to certain embodiments. The method 700 depicted in FIG. 7 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method 700 presented in FIG. 7 and described below is intended to be illustrative and non-limiting. Although FIG. 7 depicts the various processing steps occurring in a particular sequence or order, this is not intended to be limiting. In certain alternative embodiments, the processing may be performed in some different order, or some steps may also be performed in parallel.

One or more of the processing steps depicted herein may be performed or facilitated by an implementation of the training and optimization subsystem 135 included in the model generation system 115 or other components. FIG. 7 depicts an example implementation for reduction of the hyperparameter search space as discussed above in 535. At 705, the training and optimization subsystem 135 selects a hyperparameter from the set of hyperparameters. For example, an exponential smoothing ML model for modeling time series data 105 may include hyperparameters such as the smoothing level, a trend smoothing parameter, a seasonal smoothing parameter, seasonal periods, and so on. In this step, one of these hyperparameters is selected. In some examples, the training and optimization subsystem 135 may iterate over all hyperparameters. Assume, as an example, that the training and optimization subsystem 135 begins with a smoothing level hyperparameter. In a typical exponential smoothing ML model, the smoothing level varies between 0 and 1.

Continuing with the smoothing level example, the training and optimization subsystem 135 may iterate over the $N_{top}$ trials and temporarily store the value of the smoothing level used in each trial. At 710, the training and optimization subsystem 135 determines a highest value for the selected hyperparameter based upon the $N_{top}$ trials selected in 525 and at 715, the training and optimization subsystem 135 determines a lowest value for the selected hyperparameter based upon the $N_{top}$ trials selected in 525. For instance, the training and optimization subsystem 135 can inspect the temporarily stores valued and determine that maximum and minimum smoothing values used in any of the $N_{top}$ trials. If the smoothing level of the previous example included values from 5 $N_{top}$ trials of 0.02, 0.3, 0.6, 0.65, and 0.66, the highest and lowest values for the reduced search space are 0.66 and 0.02, respectively. In some examples, the new upper and lower bounds are exclusive and do not include the boundary values. In some other examples, the lower bound and upper bound values are inclusive and do include the boundary values.

At 710, the training and optimization subsystem 135 identifies a reduced search space 330 for the hyperparameter based upon the highest value determined in 710 and the lowest value determined in 715, where the reduced search space 330 corresponds to a range of values determined based upon the highest value and the lowest value, and where the number of values in the reduced search space for the hyperparameter is smaller than the number of values in the full search space for the hyperparameter. Continuing with the exponential smoothing example above, the reduced search space is bounded by 0.02 and 0.66. The trials in the reduced search space stage 330 will include hyperparameter values in those bounds. Thus, the reduced search space effectively reduced the number of possible values for the smoothing level by about 40%.

The steps of FIG. 7 and the accompanying description can be repeated for multiple hyperparameters to determine a reduced search space for each of the multiple hyperparameters. In some examples, the process described above may be performed over the set of all hyperparameters by iterating over each hyperparameter and carrying out the steps of FIG. 7. It should be noted that the method for determining the reduced hyperparameter search space described in this figure is just an example. A person of ordinary skill in the art will recognize other processes for determining the reduced hyperparameter search space.

FIG. 8 depicts a simplified flowchart showing a method 800 for time-bound hyperparameter optimization techniques, according to certain embodiments. The method 800 depicted in FIG. 8 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method 800 presented in FIG. 8 and described below is intended to be illustrative and non-limiting. Although FIG. 8 depicts the various processing steps occurring in a particular sequence or order, this is not intended to be limiting. In certain alternative embodiments, the processing may be performed in some different order, or some steps may also be performed in parallel.

One or more of the processing steps depicted herein may be performed or facilitated by an implementation of the training and optimization subsystem 135 included in the model generation system 115 or other components. FIG. 8 depicts several steps included in an example implementation of the reduced search space stage 330. Beginning at 805, the training and optimization subsystem 135 executes $N_{reduced}$ number of second trials using the reduced set of features identified in 530 and the reduced search space 330 for one or more hyperparameters determined in 535. As with the full hyperparameter search space, executing a trial includes training the ML model using the training data or a subset thereof to completion. Similar strategies for the ones described above in 135 can be used for selection of distinct hyperparameters for each trial.

Importantly, however, the reduced hyperparameter search space determined in 535 is now used. This may involve, for example, updating a configuration for the hyperparameter optimization framework (e.g., Optuna) to use the hyperparameter bounds determined in 535 and detailed in FIG. 7 and the accompanying description.

At 810, the training and optimization subsystem 135 selects a particular trial with the best results from the second trials executed in 805. Following completion of the $N_{reduced}$ trials in the reduced search space stage 330, the execution of trials for hyperparameter optimization is complete. The outcome of the $N_{reduced}$ trials from the reduced search space stage 330 are evaluated to identify the trial with optimized performance. For instance, optimized performance can be defined as the trial that maximized accuracy or that minimized the mean squared error, among other criteria. The criteria used to determine optimized performance may vary between ML model types. The trials of the reduced search space stage 330 are used because this narrower subset of all trials is executed against a limited feature set, which may result in a simpler and more robust ML model. Additionally, limiting selection of the particular trial to the trials of the reduced search space stage 330 can enhance the ML model by providing improved explainability.

At 815, the training and optimization subsystem 135 selects the hyperparameter values associated with the trial selected in 810 as the optimized set of hyperparameter values. Once the trial having optimized performance is identified, the hyperparameter values input to the hyperparameter optimization framework to execute that trial are identified and designated as the optimized set of hyperparameter values 125. For example, the optimized hyperparameter values 125 may be ephemerally stored in a memory device included in the training and optimization subsystem 135 in preparation for output.

At 820, the training and optimization subsystem 135 selects the trained ML model 120 resulting from the particular trial selected in 810 as the trained model to use. In some examples, this particular trained ML model 120 may provide sufficient predictive accuracy. However, in some examples, it is necessary to train the ML model again using the optimized hyperparameter values 125 and the full set of training data. In both cases, the trained ML model 120 is typically finally tested against a subset or test portion of the time series data 105 designated as the test dataset. This portion of the time series data 105 is used only for final testing of the trained ML model 120 to guard against overfitting and to validate the trained ML model 120 against data never before seen by the model.

Example Architectures for Providing a Cloud Service

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
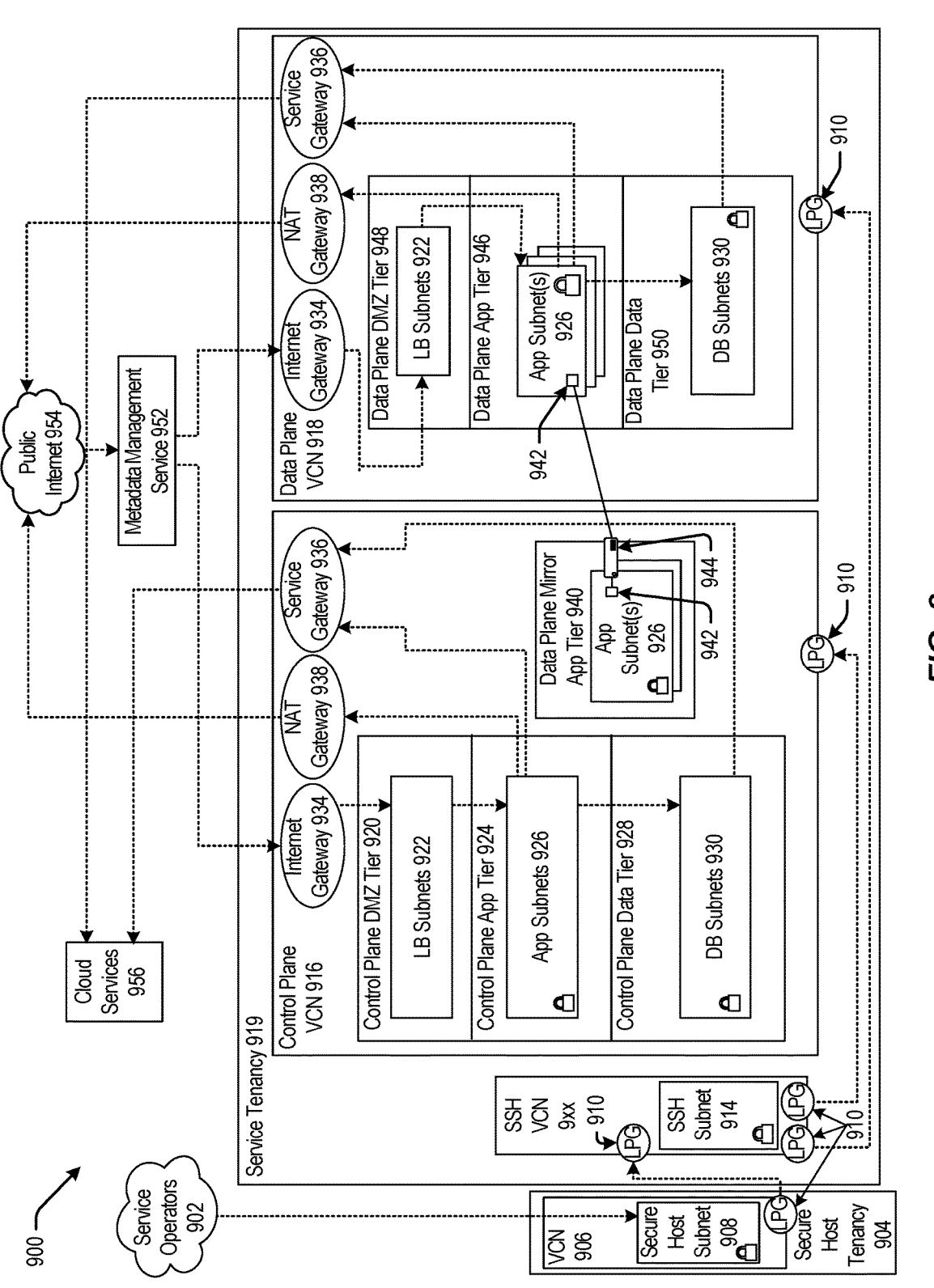
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Metadata that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
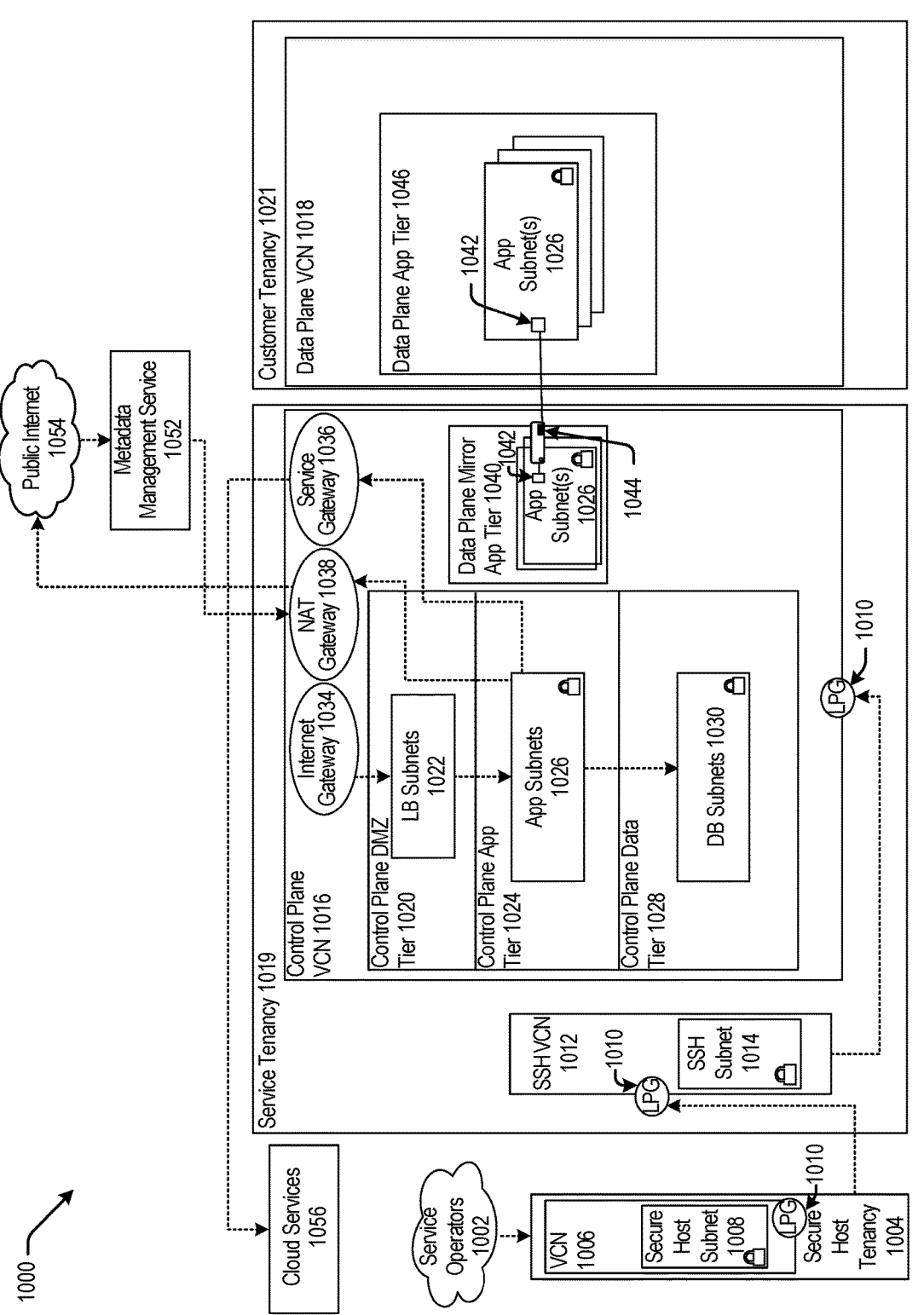
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 936 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

Figure 11:
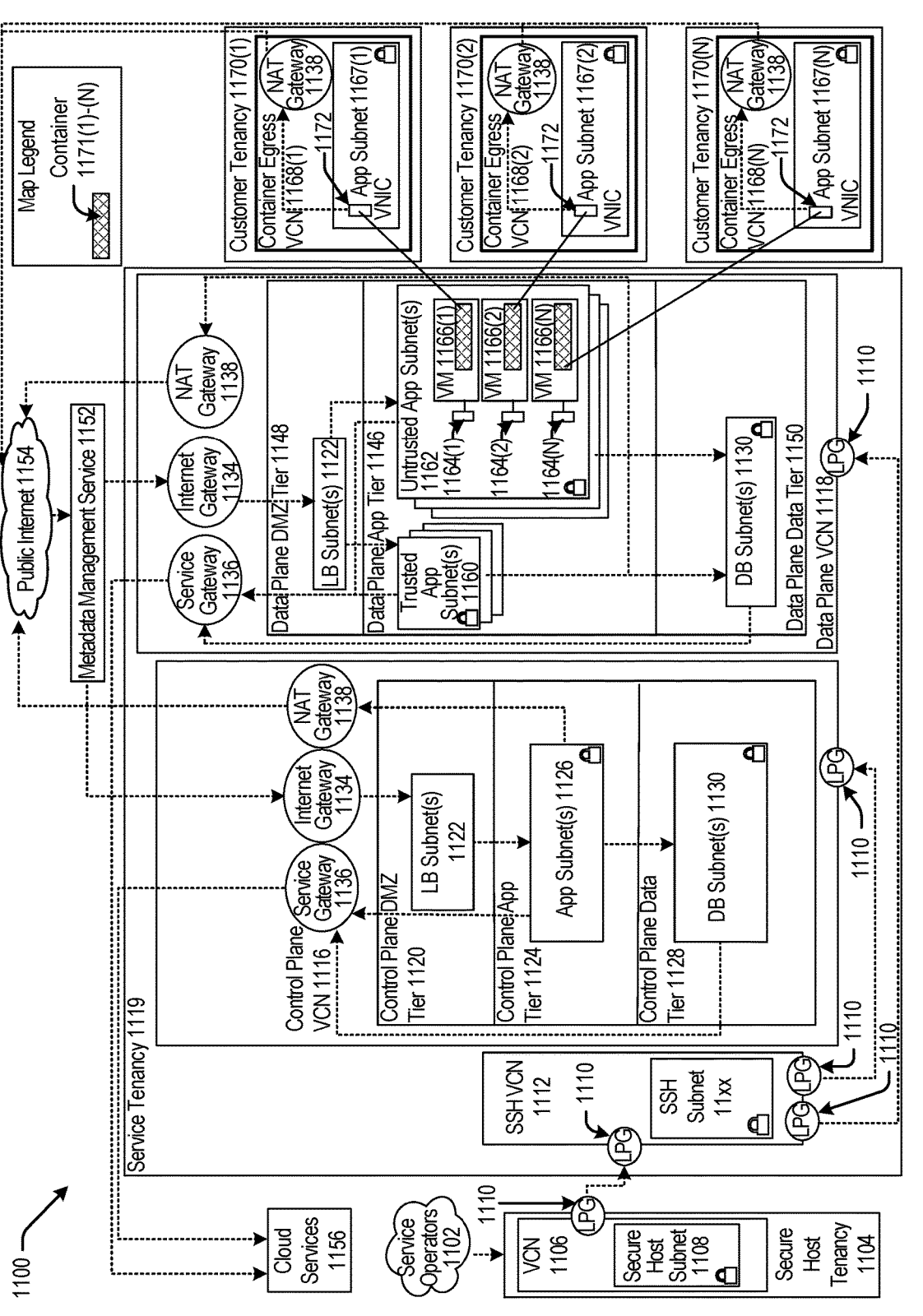
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
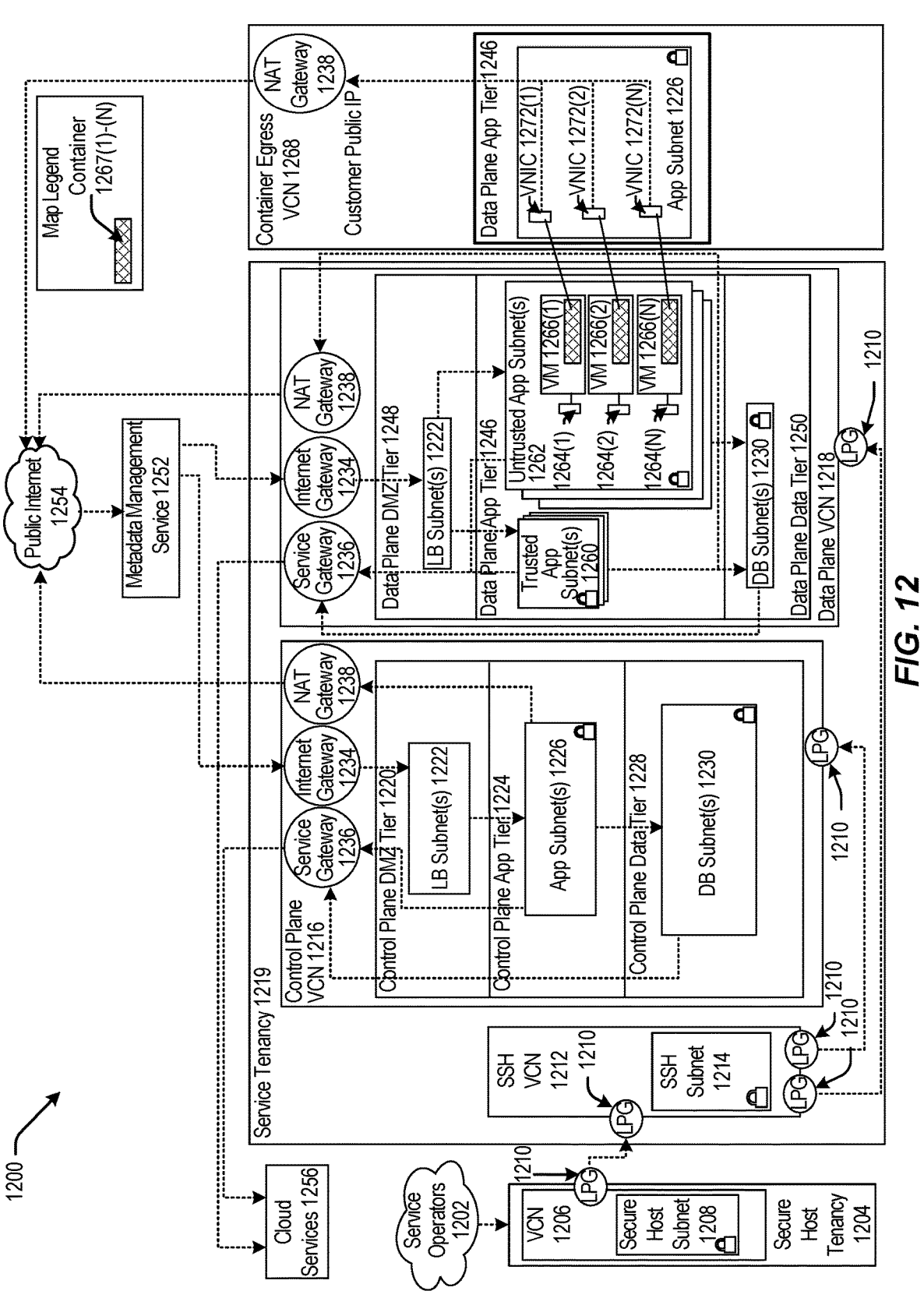
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
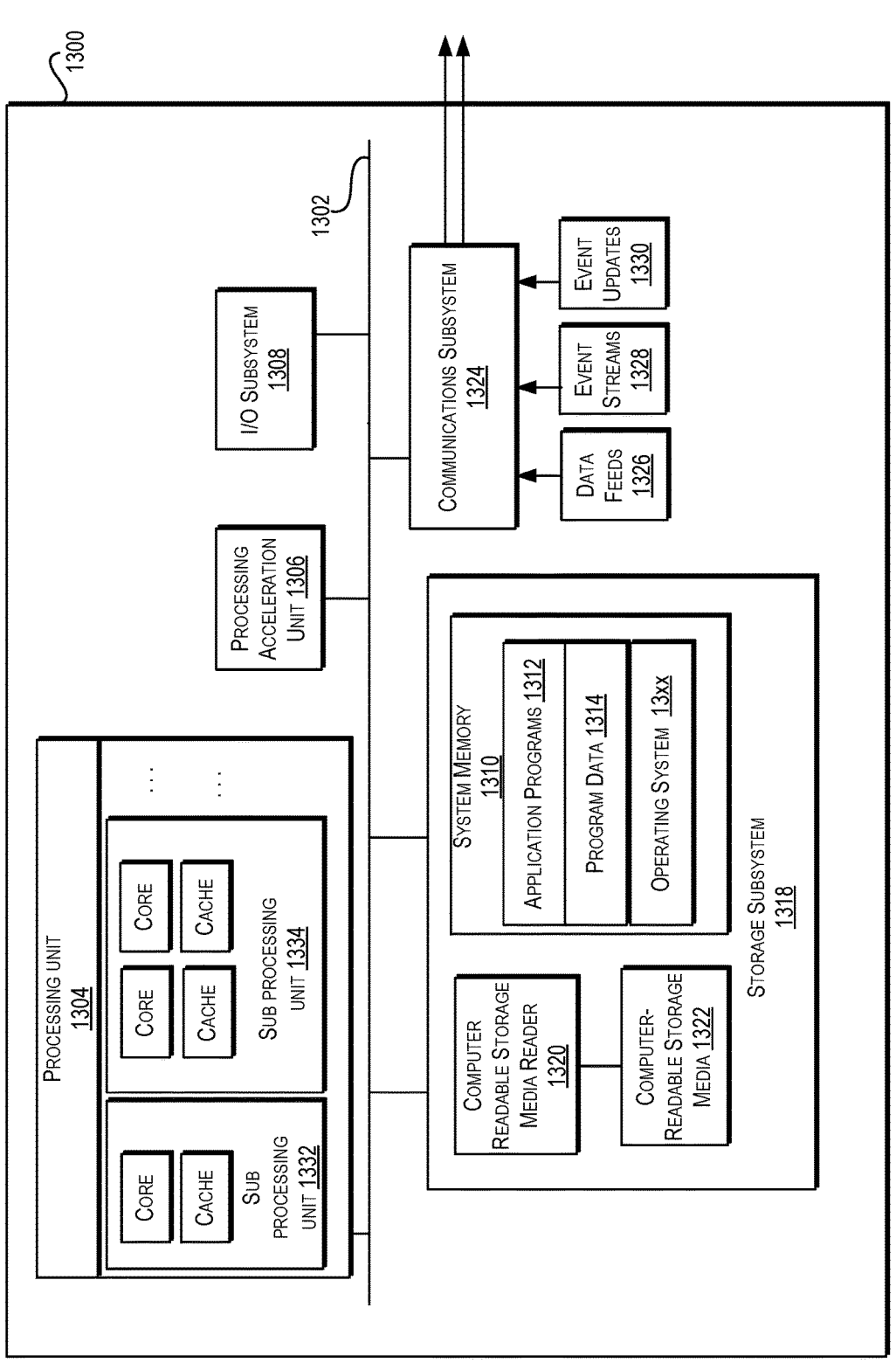
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1304 provide the functionality described above. Storage subsystem 1318 may also provide a repository for storing data used in accordance with the present disclosure.

As depicted in the example in FIG. 13, storage subsystem 1318 can include various components including a system memory 1310, computer-readable storage media 1322, and a computer readable storage media reader 1320. System memory 1310 may store program instructions that are loadable and executable by processing unit 1304. System memory 1310 may also store data that is used during the execution of the instructions and/or data that is generated during the execution of the program instructions. Various different kinds of programs may be loaded into system memory 1310 including but not limited to client applications, Web browsers, mid-tier applications, relational database management systems (RDBMS), virtual machines, containers, etc.

System memory 1310 may also store an operating system 1316. Examples of operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1300 executes one or more virtual machines, the virtual machines along with their guest operating systems (GOSs) may be loaded into system memory 1310 and executed by one or more processors or cores of processing unit 1304.

System memory 1310 can come in different configurations depending upon the type of computer system 1300. For example, system memory 1310 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1310 may include a basic input/output system (BIOS) containing basic routines that help to transfer information between elements within computer system 1300, such as during start-up.

Computer-readable storage media 1322 may represent remote, local, fixed, and/or removable storage devices plus storage media for temporarily and/or more permanently containing, storing, computer-readable information for use by computer system 1300 including instructions executable by processing unit 1304 of computer system 1300.

Computer-readable storage media 1322 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Machine-readable instructions executable by one or more processors or cores of processing unit 1304 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   determining a total time available ($T_{avail}$) for training a machine learning (ML) model using a training dataset, the training comprising performing hyperparameter optimization for the ML model;
   executing a number ($N_{initial}$) of initial trials, wherein executing the number of initial trials comprises, for each trial in the initial trials:

for each hyperparameter in a set of hyperparameters, selecting a hyperparameter value for the hyperparameter from a full search space associated with the hyperparameter, and
   training the ML model using the training dataset and the selected set of hyperparameter values;
determining an approximate time for executing a trial ($T_{approx}$) based upon executing the initial trials;
using a first computer-implemented technique to determine a first number ($N_{search}$) of first trials to be executed, wherein using the first computer-implemented technique comprises using the total time available ($T_{avail}$) and the approximate time for executing a trial ($T_{approx}$);
executing the first number ($N_{search}$) of first trials, wherein executing the first number of first trials comprises, for each first trial in the first trials:
   for each hyperparameter in the set of hyperparameters, selecting a hyperparameter value for the hyperparameter from a full search space associated with the hyperparameter, and
   training the ML model using the training dataset and the selected set of hyperparameter values;
using a second computer-implemented technique to determine a second number ($N_{reduced}$) of second trials to be executed, wherein the second computer-implemented technique comprises uses $N_{search}$;
executing the second number ($N_{reduced}$) of second trials, wherein executing the second number of second trials comprises, for each second trial in the second trials:
   for each hyperparameter in the set of hyperparameters, selecting a hyperparameter value for the hyperparameter from a reduced search space associated with the hyperparameter; and
   training the ML model using the training dataset and the selected set of hyperparameter values selected from the reduced search space associated with each hyperparameter in the set of hyperparameters;
selecting a particular second trial from the second trials;
designating the hyperparameter values used for the particular second trial as a set of optimized hyperparameter values; and
outputting a trained ML model trained in the particular second trial and the set of optimized hyperparameter values.

2. The method of claim 1, wherein using the first computer-implemented technique comprises:
   based upon the total time available ($T_{avail}$) for training the ML model and the approximate time for executing a trial, determining an approximate number of trials ($N_o$);
   determining a first Fibonacci number using $N_o$; and
   determining the first number ($N_{search}$) of first trials by subtracting the number ($N_{initial}$) of initial trials from the first Fibonacci number.

3. The method of claim 2 wherein determining the first Fibonacci number comprises:
   determining n using the equation $n(1+F^2)=N_o$, wherein F is a ratio represented by $$\frac{1+\sqrt{5}}{2};$$

and
   identifying a Fibonacci number that is equal to or greater than $nF^2$ as the first Fibonacci number.

4. The method of claim 2, wherein using the second computer-implemented technique comprises:

determining a third Fibonacci number based upon the first Fibonacci number; and designating the third Fibonacci number as the second number ($N_{reduced}$) of second trials.

5. The method of claim 4 wherein determining the third Fibonacci number comprises:

identifying a sequence of three consecutive Fibonacci numbers, wherein the first Fibonacci number is the largest number in the sequence; and designating the smallest Fibonacci number in the sequence as the third Fibonacci number.

6. The method of claim 4 further comprising:

selecting a number ($N_{top}$) of top trials from the initial trials and the first trials;

based upon the selected top trials, for at least one hyperparameter in the set of hyperparameters, identifying a reduced search space for the at least one hyperparameter, where the identified reduced search space for the at least one hyperparameter has a smaller number of values than a number of values in the full search space for the at least one hyperparameter; and wherein executing the second number ($N_{reduced}$) of second trials comprises, for each second trial, setting a value for the at least one hyperparameter from the reduced search space identified for the at least one hyperparameter.

7. The method of claim 6 wherein selecting the number ($N_{top}$) of top trials from the initial trials and the first trials comprises:

determining a second Fibonacci number based upon the first Fibonacci number; and designating the second Fibonacci number as $N_{top}$.

8. The method of claim 7 wherein determining the second Fibonacci number comprises designating a Fibonacci number that immediately precedes the first Fibonacci number as the second Fibonacci number.

9. The method of claim 6 wherein identifying the reduced search space for the at least one hyperparameter comprises:

determining a highest value used for the at least one hyperparameter in the selected top trials;

determining a lowest value used for the at least one hyperparameter in the selected top trials; and determining a range of values wherein the range is bounded by the highest value and the lowest value, wherein the range represents the reduced search space for the at least one hyperparameter.

10. The method of claim 4 further comprising:

selecting a number ($N_{top}$) of top trials from the initial trials and the first trials;

based upon the selected top trials:

for at least one hyperparameter in the set of hyperparameters, identifying a reduced search space for the hyperparameter, where the identified reduced search space for the hyperparameter has a smaller number of values then a number of values in the full search space for the at least one hyperparameter; and identifying a reduced set of features from a set of features used in the initial trials and in the first trials;

wherein executing the second number ($N_{reduced}$) of second trials comprises, for each second trial:

setting a value for the at least one hyperparameter from the reduced search space identified for the at least one hyperparameter; and using the reduced set of features.

11. The method of claim 10 wherein identifying the reduced set of features comprises:

selecting one or more features, from the set of features, to be included in the reduced set of features based upon feature importance scores assigned to the set of features.

12. The method of claim 1, wherein, for at least one trial in the initial trials, first trials, or second trials, Bayesian optimization is used to select values for the hyperparameters in the set of hyperparameters.

13. The method of claim 1, wherein determining the approximate time for executing a trial comprises:

determining an execution time taken for executing each of the initial trials;

determining an average time by averaging the execution times determined for executing each of the initial trials; and designating the average time as the approximate time for executing a trial.

14. The method of claim 1, wherein the training dataset comprises one or more time series, each time series comprising a plurality of datapoints, each data point in the plurality of datapoints characterized by a time and at least one associated value.

15. The method of claim 1, wherein selecting the particular second trial from the second trials comprises selecting a trial from the second trials having a highest performance metric.

16. The method of claim 1, wherein different combinations of hyperparameter values are used for the initial trials, the first trials, and the second trials.

17. The method of claim 1, wherein the training dataset comprises a training portion, a validation portion, and a test portion, wherein the validation portion is used during hyperparameter optimization.

18. A system comprising:

a set of processors;

a memory storing a set of optimized hyperparameter values for a trained machine learning ("ML") model, wherein determining the set of optimized hyperparameter values comprises:

determining a total time available ($T_{avail}$) for training a machine learning (ML) model using a training dataset, the training comprising performing hyperparameter optimization for the ML model;

executing a number ($N_{initial}$) of initial trials, wherein executing the number of initial trials comprises, for each trial in the initial trials:

for each hyperparameter in a set of hyperparameters, selecting a hyperparameter value for the hyperparameter from a full search space associated with the hyperparameter, and training the ML model using the training dataset and the selected set of hyperparameter values;

determining an approximate time for executing a trial ($T_{approx}$) based upon executing the initial trials;

using a first computer-implemented technique to determine a first number ($N_{search}$) of first trials to be executed, wherein using the first computer-implemented technique comprises using the total time available ($T_{avail}$) and the approximate time for executing a trial ($T_{approx}$);

executing the first number ($N_{search}$) of first trials, wherein executing the first number of first trials comprises, for each first trial in the first trials:

for each hyperparameter in the set of hyperparameters, selecting a hyperparameter value for the hyperparameter from a full search space associated with the hyperparameter, and training the ML model using the training dataset and the selected set of hyperparameter values;

using a second computer-implemented technique to determine a second number ($N_{reduced}$) of second trials to be executed, wherein the second computer-implemented technique comprises uses $N_{search}$;

executing the second number ($N_{reduced}$) of second trials, wherein executing the second number of second trials comprises, for each second trial in the second trials:

for each hyperparameter in the set of hyperparameters, selecting a hyperparameter value for the hyperparameter from a reduced search space associated with the hyperparameter; and training the ML model using the training dataset and the selected set of hyperparameter values selected from the reduced search space associated with each hyperparameter in the set of hyperparameters;

selecting a particular second trial from the second trials;

designating the hyperparameter values used for the particular second trial as a set of optimized hyperparameter values; and outputting a trained ML model trained in the particular second trial and the set of optimized hyperparameter values.

19. The system of claim 18, wherein:

using the first computer-implemented technique comprises:

based upon the total time available ($T_{avail}$) for training the ML model and the approximate time for executing a trial, determine an approximate number of trials ($N_o$);

determining a first Fibonacci number using $N_o$; and determining the first number ($N_{search}$) of first trials by subtracting the number ($N_{initial}$) of initial trials from the first Fibonacci number; and using the second computer-implemented technique comprises:

determining a third Fibonacci number based upon the first Fibonacci number; and designating the third Fibonacci number as the second number ($N_{reduced}$) of second trials.

20. A non-transitory computer-readable medium storing computer-executable instructions that, when executed by one or more computer devices, cause the computing devices to perform processing comprising:

determining a total time available ($T_{avail}$) for training a machine learning (ML) model using a training dataset, the training comprising performing hyperparameter optimization for the ML model;

executing a number ($N_{initial}$) of initial trials, wherein executing the number of initial trials comprises, for each trial in the initial trials:

for each hyperparameter in a set of hyperparameters, selecting a hyperparameter value for the hyperparameter from a full search space associated with the hyperparameter, and training the ML model using the training dataset and the selected set of hyperparameter values;

determining an approximate time for executing a trial ($T_{approx}$) based upon executing the initial trials;

using a first computer-implemented technique to determine a first number ($N_{search}$) of first trials to be executed, wherein using the first computer-implemented technique comprises using the total time available ($T_{avail}$) and the approximate time for executing a trial ($T_{approx}$);

executing the first number ($N_{search}$) of first trials, wherein executing the first number of first trials comprises, for each first trial in the first trials:

for each hyperparameter in the set of hyperparameters, selecting a hyperparameter value for the hyperparameter from a full search space associated with the hyperparameter, and training the ML model using the training dataset and the selected set of hyperparameter values;

using a second computer-implemented technique to determine a second number ($N_{reduced}$) of second trials to be executed, wherein the second computer-implemented technique comprises uses $N_{search}$;

executing the second number ($N_{reduced}$) of second trials, wherein executing the second number of second trials comprises, for each second trial in the second trials:

for each hyperparameter in the set of hyperparameters, selecting a hyperparameter value for the hyperparameter from a reduced search space associated with the hyperparameter; and training the ML model using the training dataset and the selected set of hyperparameter values selected from the reduced search space associated with each hyperparameter in the set of hyperparameters;

selecting a particular second trial from the second trials;

designating the hyperparameter values used for the particular second trial as a set of optimized hyperparameter values; and outputting a trained ML model trained in the particular second trial and the set of optimized hyperparameter values.

* * * * *